(12) United States Patent
Koretzky et al.

(10) Patent No.: US 10,014,002 B2
(45) Date of Patent: Jul. 3, 2018

(54) REAL-TIME AUDIO SOURCE SEPARATION USING DEEP NEURAL NETWORKS

(71) Applicant: Red Pill VR, Inc., Los Angeles, CA (US)

(72) Inventors: Alejandro Koretzky, Venice, CA (US); Karthiek Reddy Bokka, Los Angeles, CA (US); Naveen Sasalu Rajashekharappa, Los Angeles, CA (US)

(73) Assignee: Red Pill VR, Inc., Los Angeles, CA (US)

( * ) Notice: Subject to any disclaimer, the term of this patent is extended or adjusted under 35 U.S.C. 154(b) by 0 days.

(21) Appl. No.: 15/792,566

(22) Filed: Oct. 24, 2017

(65) Prior Publication Data

US 2018/0122403 A1    May 3, 2018

Related U.S. Application Data

(63) Continuation-in-part of application No. 15/434,419, filed on Feb. 16, 2017, now Pat. No. 9,842,609.

(60) Provisional application No. 62/295,497, filed on Feb. 16, 2016.

(51) Int. Cl.
| | |
|---|---|
| *H04R 5/00* | (2006.01) |
| *G10L 25/18* | (2013.01) |
| *G10L 25/30* | (2013.01) |
| *G10L 21/028* | (2013.01) |
| *G06F 3/16* | (2006.01) |

(52) U.S. Cl.
CPC ............ *G10L 25/18* (2013.01); *G10L 21/028* (2013.01); *G10L 25/30* (2013.01); *G06F 3/165* (2013.01)

(58) Field of Classification Search
CPC ....... G10L 25/18; G10L 21/028; G10L 21/14; G10L 21/0272; G10L 25/30; G06F 3/165; G06F 3/04847; H04S 2420/07; H04S 5/00
USPC ............................................... 381/17, 20, 22
See application file for complete search history.

(56) References Cited

U.S. PATENT DOCUMENTS

| | | | |
|---|---|---|---|
| 2016/0071526 A1* | 3/2016 | Wingate ................ | G10L 21/028 704/233 |
| 2017/0061978 A1* | 3/2017 | Wang ................... | G10L 21/0232 |
| 2017/0316792 A1* | 11/2017 | Chaudhuri .............. | G10L 25/93 |

* cited by examiner

*Primary Examiner* — Matthew Eason
*Assistant Examiner* — Sabrina Diaz
(74) *Attorney, Agent, or Firm* — Hickman Palermo Becker Bingham LLP

(57) ABSTRACT

Methods and systems for audio source separation in real-time are described. In an embodiment, the present disclosure describes reading and decoding an audio source into PCM samples, fragmenting Pulse Code Modulation (PCM) samples into fragments, transforming fragments into spectrograms, performing audio source separation using a deep neural network (DNN) to generate an estimated magnitude spectrogram of the component(s) of the audio source, reconstructing the estimated time domain component signals, and streaming the component signals to a playback engine. In an embodiment, a semantic equalizer graphical user allows for real-time mixing of individual component signals.

18 Claims, 14 Drawing Sheets

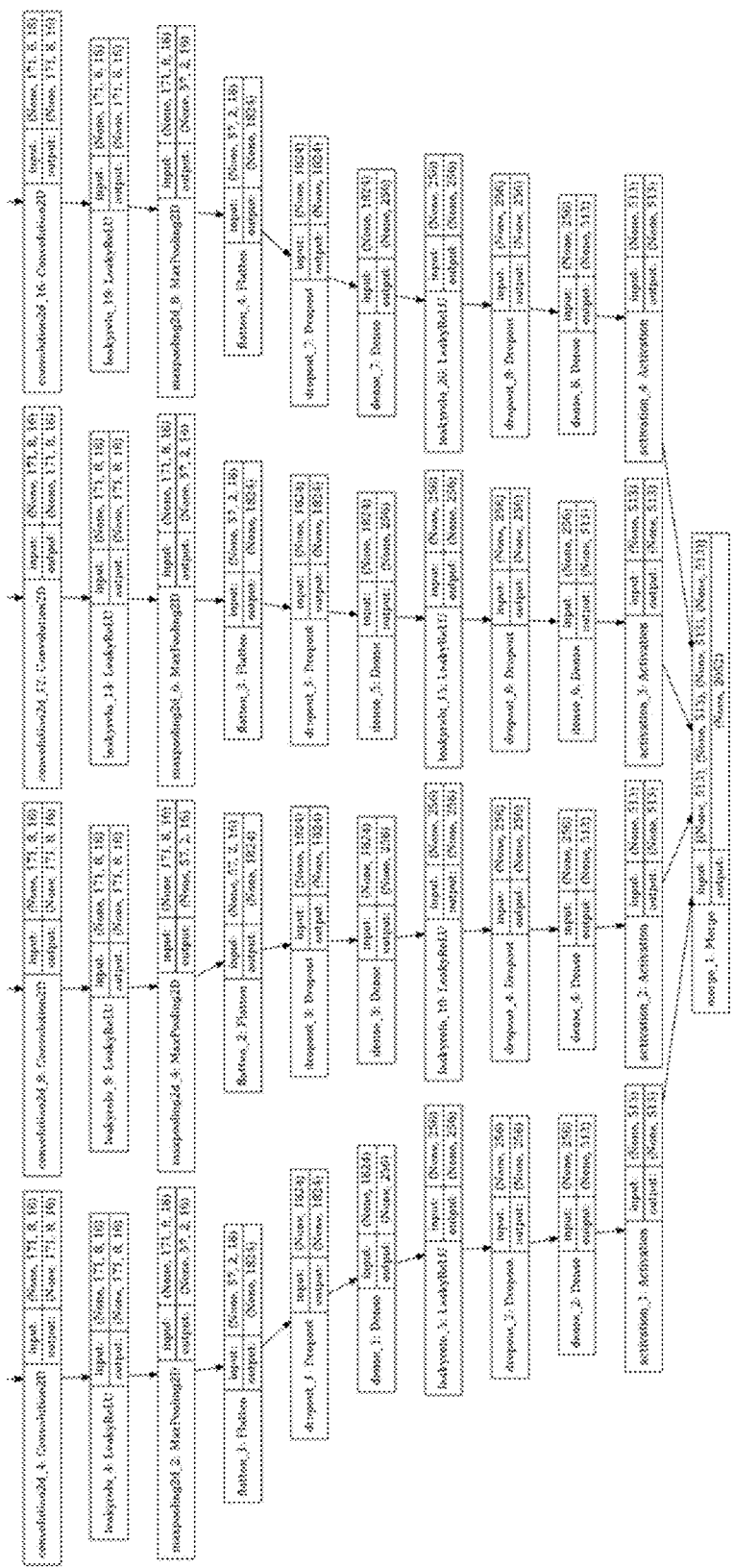
[Continued from Figure 10A]
Figure 10B

REAL-TIME AUDIO SOURCE SEPARATION USING DEEP NEURAL NETWORKS

CROSS-REFERENCE TO RELATED APPLICATIONS; BENEFIT CLAIM

This application claims the benefit as a Continuation-in-Part of U.S. patent application Ser. No. 15/434,419, filed on Feb. 16, 2017, the entire contents of which are hereby incorporated by reference as if fully set forth herein, under 35 U.S.C. § 120. This application claims the benefit of U.S. Provisional Patent Application No. 62/295,497, filed Feb. 16, 2016, the entire contents of which is hereby incorporated by reference as if fully set forth herein, under 35 U.S.C. § 119(e). The applicant(s) hereby rescind any disclaimer of claim scope in the parent application(s) or the prosecution history thereof and advise the USPTO that the claims in this application may be broader than any claim in the parent application(s)

TECHNICAL FIELD

The present application relates to digital signal processing. More specifically, the example embodiment(s) of the present invention described below relate to real-time audio source separation.

BACKGROUND

In the field of digital signal processing, audio source separation is a problem where several audio signals have been mixed together into a combined signal and the goal is to recover the original component signals from the combined signal. Audio source separation has many practical applications including, but not limited to speech enhancement, speech recognition, speech denoising, voice recognition, audio post-production and remastering, spatial audio upmixing, and other audio functions. Denoising includes separating noise from speech, removing background music from speech, and removing bleed from other instruments. In the context of music production, audio source separation is sometimes referred to as "unmixing" or "de-mixing".

Traditional audio equalizers have historically been used to emphasize or deemphasize certain content present in an audio signal. They work by boosting or attenuating certain frequencies bands present in the audio signal. The main limitation however is that they cannot discriminate and/or separate two signals that have frequencies in common. Thus, what is needed is the ability to separate mixed signals that have frequencies in common.

Several approaches have been proposed over the years to solve the audio source separation problem, however, these approaches are inadequate.

Beamforming is a technique for source separation that uses a microphone array to listen to a particular direction to capture desired signals while minimizing interfering ones. A shortcoming of the existing beamforming techniques is that they require multiple versions of the same recording to be captured with multiple microphones.

Adaptive signal processing is a technique for source separation that filters unwanted parts of a signal by self-adjusting parameters of the filter. A shortcoming of the adaptive signal processing technique is that it requires prior knowledge about the statistics of the interfering signal. For example, in order to perform adaptive signal processing on a combined signal, it would be necessary to have prior knowledge regarding the types of expected noise in the combined signal.

Independent component analysis, also known as blind source separation (BSS), is a technique for source separation that uses a measure of statistical independence of the component signals in the combined signal to identify and separate the sources. This technique does not require prior knowledge about the sound sources, except for their mutual statistical independence. A shortcoming of this approach is that it assumes, among other things, that the sources have been linearly mixed into a combined signal. However, in the context of professionally produced music, processes like mastering apply several nonlinearities to a combined signal. Another shortcoming is that independent component analysis cannot separate or discriminate arbitrary sources (e.g., different types of musical instruments, such as drums, bass, piano) without prior knowledge about the sources or their semantics. Another shortcoming in the context of professionally produced music is that, in most cases, the sources are not fully statistically independent. Overall, in practice, this approach performs very poorly in the context of professional music recordings.

Classical denoising and enhancement is a technique for source separation that uses a Wiener filtering and spectral subtraction to separate the audio sources. A shortcoming of this approach is that it assumes prior knowledge of the spectral properties of the original signal and the noise.

Non-Negative Matrix Factorization (NMF) is a popular technique for processing audio, image and text. This technique has been widely used by itself or in combination with other techniques for audio source separation. A shortcoming of existing NMF techniques in the context of source separation is that it relies on a fixed set of spectral templates describing the spectral characteristics of the underlying sources in a given combined signal. Because commercial music has so much variety in terms of sounds, the effectiveness of this approach is highly dependent on the degree to which these default spectral templates represent the spectral characteristics of the underlying sources in a combined signal. In summary, the existing approach to source separation using NMF requires the arbitrary selection of a number of spectral templates and it does not use information from the input combined signal to adapt these spectral templates to better match the underlying sources, which is the key to accurate discrimination and reconstruction of the sources. What is needed is improved techniques to audio source separation that dynamically adapt to the combined signal with real-time performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
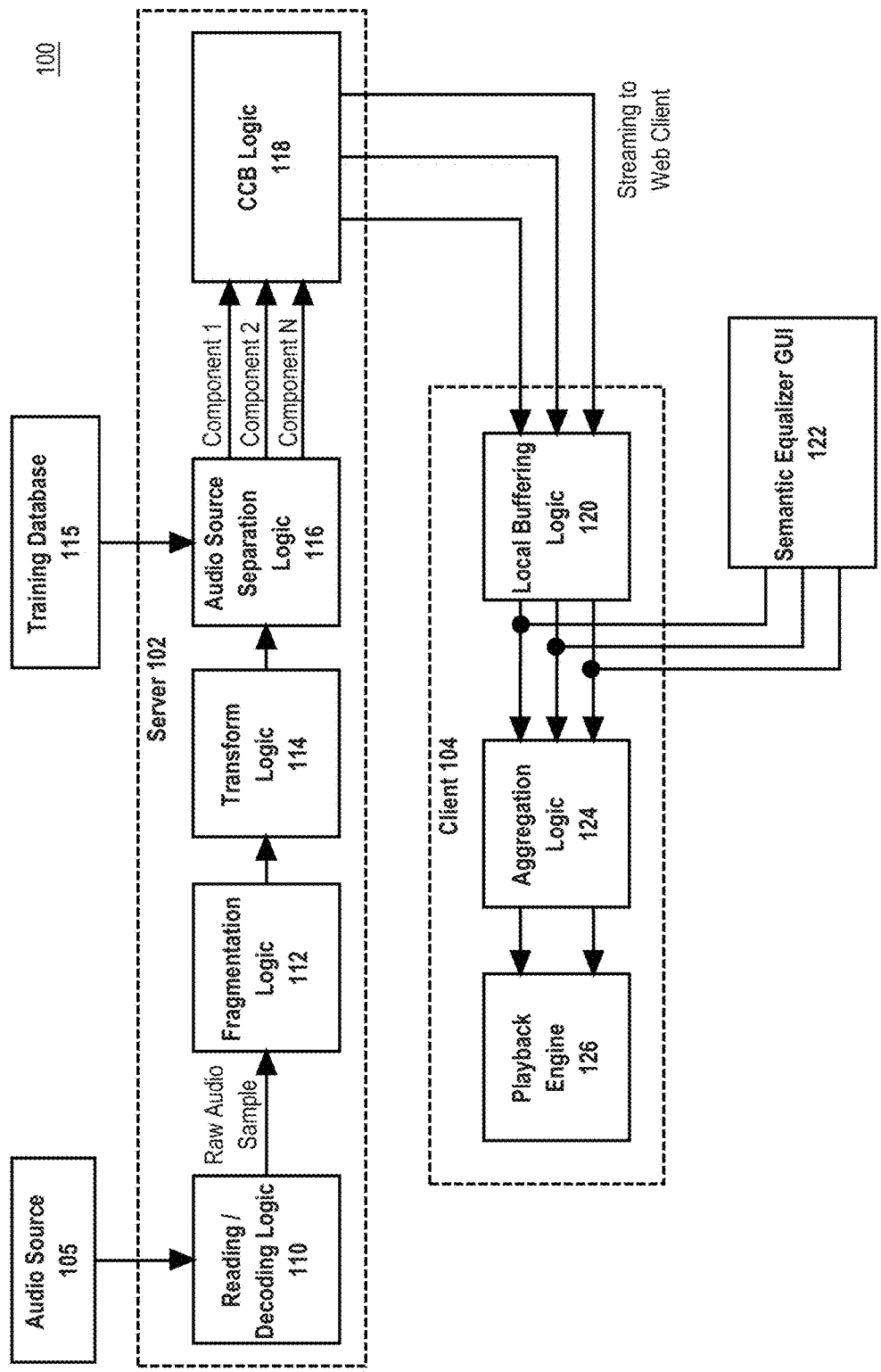
FIG. 1 is a block diagram of an audio source separation system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
  2.1 READING/DECODING LOGIC
  2.2 FRAGMENTATION LOGIC
  2.3 TRANSFORM LOGIC
  2.4 AUDIO SOURCE SEPARATION LOGIC
    2.4.1 IDENTIFICATION AND CLASSIFICATION OF CANDIDATE COMPONENT SIGNALS
    2.4.2 CUSTOM DICTIONARY CONSTRUCTION
    2.4.3 SPECTROGRAM DECOMPOSITION AND SIGNAL RECONSTRUCTION
    2.4.4 DEEP NEURAL NETWORKS (DNNs)
      2.4.4.1 DNN INPUT SAMPLE
      2.4.4.2 DNN INFERENCE
      2.4.4.3 DNN TRAINING
      2.4.4.4 DNN MODELS
  2.5 CONCATENATION, CROSSFADING & BUFFERING (CCB) LOGIC
  2.6 LOCAL BUFFERING LOGIC
  2.7 SEMANTIC EQUALIZER GUI
  2.8 AGGREGATION LOGIC
  2.9 PLAYBACK ENGINE
  2.10 APPLICATION AREAS
3.0 EXAMPLE PROCESSES AND ALGORITHMS
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE 1.0 General Overview In one embodiment, an audio source separation system is programmed or configured to receive an audio source file that includes stereo combined audio signal and perform source separation on the combined audio signal to generate one or more component signals. The combined audio signal may represent a mix of various signals. For example, the individual component signals may correspond to individual musical instruments, voices, or other sound sources.

Audio source separation is performed by reading and decoding an audio source file into raw audio samples. The raw audio samples may be fragmented into raw audio fragments to provide for real-time processing. Each raw audio fragment may be transformed into a spectrogram. The spectrogram may be analyzed using Non-negative matrix factorization (NMF) techniques along with a training dictionary of reference spectral templates to identify specific content in the spectrogram. Specific content may include musical instruments, voices, or any other unique audio source or component. In an embodiment, the specific content is identified as a linear combination of component spectral templates. The component spectral templates can then be used to reconstruct the component signals of the original audio source into component signal fragments. The component signal fragments may be concatenated, cross-faded, and buffered for playback at a playback device.

In an alternative embodiment, audio source separation may be performed by applying deep neural network (DNN) inference techniques, instead of analyzing spectrograms using NMF techniques and/or spectral templates. Prior to receiving an audio source, a DNN may be trained using a training dataset. The training dataset may include a large set of data representing mixed signals and known component signals identified in the mixed signals. The training dataset may be very large and may be used to train the DNN to perform audio source separation. After training the DNN, the DNN may be applied to a spectrogram to perform audio source separation instead of the previously mentioned technique using spectral templates and NMF. Using a DNN provides various improvements over existing source separation techniques. A DNN may be adaptively trained over a training dataset, which can be customized to provide identification of particular components of interest in audio signals, such as particular instruments, sounds, or voices. By using a DNN, building dictionaries for instrument identification is not necessary. In an embodiment, a DNN may be continuously trained based on new audio sources that are analyzed, so that it continually improves in performance of identifying specific content in the spectrogram over time.

In an embodiment of the present invention, a graphical user interface is provided that allows the end user to set the gains of the separated component signals independently. This is implemented by providing a user interface with a number of volume faders. By moving each fader from minimum gain (0% volume) to maximum gain (100% volume) the user can select the desired amount of signal from each component signal, which are recombined on real time and delivered in stereo format to the output listening device.

The present disclosure thus provides for real-time audio source separation of a combined audio signal into component signals. This real-time audio source separation provides a variety of useful application areas, such as visualization and manipulation of component signals in mobile devices, music production, augmented reality, and virtual reality contexts. In an embodiment, "real-time" in this context means that processing of audio source separation is faster than the playback speed so as to prevent a bottleneck during the middle of playback. The present system provides an adaptive, highly parallel, multithreaded approach to audio source separation that can be used for breaking up a combined signal to component signals in real-time and provide for rapid playback.

2.0 Example Computer System Implementation

FIG. 1 illustrates an example audio source separation system 100 in which the techniques described herein may be practiced, according to some embodiments. In the example of FIG. 1, audio source separation system 100 is programmed or configured to read an audio source file and perform audio source separation on the audio source file in real-time. Audio source separation system 100 may be implemented across one or more physical or virtual computing devices, none of which is intended as a generic computer, since it is loaded with instructions in a new ordered combination as otherwise disclosed herein to implement the functions and algorithms of this disclosure. The example components of audio source separation system 100 shown in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Audio source separation system 100 illustrates only one of many possible arrangements of components configured to execute the programming described herein. Other arrangements may include fewer or different components, and the division of work between the components may vary depending on the arrangement.

In an embodiment, audio source separation system 100 comprises server 102 and client 104, which may be communicatively coupled over a network. The network may be any communication network, such as communication over the Internet or a private network. In an embodiment, the network may include a wireless network via one or more wireless transmission protocols, such as 802.11 a/b/g/n, Bluetooth, LTE, 3G, CDMA, or any other wireless protocol.

In another embodiment, one or more components of server 102 and/or client 104 may be implemented on the same device. Thus, the separation of components of server 102 and/or client 104 is merely illustrative of one possible client-server architecture. In other embodiments, some or all of the components may be implemented on the same computing device.

2.1 Reading/Decoding Logic

Server 102 may optionally include reading/decoding logic 110. Reading/decoding logic 110 is programmed or configured to read an audio source 105 and generate a plurality of raw audio samples based on the audio source 105. For example, in one embodiment, each second of audio taken from an audio source that is read from a commercial compact disk (CD) music may include 44100 raw audio samples. The reading/decoding logic 110 is communicatively coupled to fragmentation logic 112 and can send audio samples to fragmentation logic 112 for further processing.

Audio source 105 may be any audio stream or audio file accessible to server 102. For example, audio source 105 may be an audio stream or audio file implemented in an uncompressed audio format, a lossless compressed audio format, or a lossy compressed audio format. Examples of file formats of audio source 105 include, but are not limited to: .AAC, .AIFF, .AU, .DVF, .M4A, M4P, MP3, .OGG, .RAW, .WAV, and/or .WMA. Audio source 105 represents a combined audio signal that includes one or more component audio signals. In an embodiment, audio source 105 may be a stereo signal.

Server 102 includes reading/decoding logic 110 that is programmed or configured to read audio source 105, decode audio source 105 if necessary, and generate a plurality of audio samples based on audio source 105. A raw audio sample is an audio sample taken in the time domain. For example, a pulse-code modulation (PCM) sample is an example of a raw audio sample. A PCM signal is a sequence of digital audio samples containing data that provides the necessary information to reconstruction an original analog signal. Each PCM sample represents the amplitude of the PCM signal at a specific point in time, and the PCM samples are uniformly spaced in time. In one embodiment, the amplitude is the only information explicitly stored in the PCM sample, and it is typically stored as either an integer or a floating point number, and encoded as a binary number with a number of fixed number of digits which represents the sample's bit depth.

In some embodiments, the audio source 105 does not need to be decoded as the audio source 105 itself includes a raw audio sample. For example, a .WAV file format includes raw audio samples embedded directly in the file, thus, decoding is not necessary. On the other hand, the .MP3 file format is a compressed, lossy format, therefore decoding of the audio source 105 is necessary using an appropriate MP3 decoder in order to generate the raw audio sample(s) from the audio source 105. Reading/decoding logic 110 can be programmed or configured to include various audio source 105 readers and decoders for various audio file formats and may select the appropriate readers and/or decoders for generating a raw audio sample based on the particular file format of the audio source 105.

Once the raw audio samples have been generated, reading/decoding logic 110 can send raw audio sample(s) to fragmentation logic 112.

2.2 Fragmentation Logic

Server 102 includes fragmentation logic 112 which is programmed or configured to select a fixed number of raw audio samples for further processing. Given the large amount of data that can be present in a full audio source 105, it is inefficient to process all raw audio samples simultaneously. Processing all such raw audio samples simultaneously would reduce the ability to provide audio source separation in real-time. Instead, by fragmenting the raw audio samples, fragmentation logic 112 can break up the processing into smaller chunks that will allow for real-time audio source separation and playback at client 104. Thus, by fragmenting the incoming raw audio samples, fragmentation logic 112 allows the audio source separation system 100 to continue processing the incoming data as an ongoing pipeline.

Fragmentation logic 112 is programmed or configured to select a fixed number of raw audio samples for further processing based on a fragment size. The fragment size used by fragmentation logic 112 may be programmed or configured via a configuration setting. Varying the fragment size can provide various tradeoffs. A smaller fragment size will ensure that the downstream audio source separation logic 116 receives data for processing sooner thereby providing quicker playback to client 104, but at the expense of having to process more fragments. Alternatively, a larger fragment size may delay the processing of the fragments by the audio source separation logic 116 thereby delaying playback by client 104, however, it will ensure that audio source separation logic 116 has fewer fragments to process thereby reducing computing.

In one embodiment, a fragment size is selected that represents greater than or equal to 1.5 second and less than or equal to 3.0 seconds of audio. This is roughly equivalent to 66,150-132,300 samples at a sampling rate of 44,100 Hz. In an embodiment, a down-sampled version of the music may be used to generate the fragments, in order to reduce the complexity and dimensionality of the audio source separation logic 116 without compromising the quality in a significant way. For example, the down-sampled version of the music may be taken at a sampling rate of 22,050 Hz instead of 44,100 Hz.

The fragmentation logic 112 continually fragments the incoming raw audio samples and sending the fragments of the raw audio samples to transform logic 114 for further processing.

2.3 Transform Logic

Server 102 includes transform logic 102 that is programmed or configured to receive a raw audio fragment from fragmentation logic 112 and generate a spectrogram for the fragment by computing a time-frequency transform of the fragment. A spectrogram is a representation of the spectrum of frequencies in a sound as they vary with time. In an embodiment, the spectrogram is a complex-valued transform made up of complex numbers in the form of z=a+ix, where "a" represents the real part of the number and "x" represents the imaginary part of the number.

In an embodiment, a magnitude matrix may be calculated based on a spectrogram, by calculating the absolute value of the spectrogram where the y-axis represents frequency and the x-axis represents timeframes. The value in each time-frequency slot represent a specific energy level of the input signal. The magnitude matrix may be used for calculations of audio source separation and decomposition using NMF by the audio source separation logic 116.

In another embodiment, a phase matrix may be calculated based on a spectrogram, which represents phase information of the audio signal. The phase matrix includes phase values which are calculated by computing the angle of each complex value as: a tan(imag(z)/real(z)). In this equation, the phase value is calculated as the arctangent of the quotient between the imaginary part over the real part of each complex number. The phase matrix may be used by audio source separation logic 116 to combine each individual component signal's magnitude matrix with the original combined signal's phase matrix to be able to reconstruct each component signal in the combined signal.

Transform logic 102 may be programmed or configured to generate a spectrogram for a fragment by using any time-frequency transform. Examples of time-frequency transforms include Short-Time Fast Fourier Transforms (STFT), Constant-Q transforms, Wavelets, filter banks, or any other similar transform function.

In an embodiment, transform logic 114 may optionally apply non-linear interpolation to the spectrogram before sending the spectrogram to audio source separation logic 116. Applying non-linear interpolation to the spectrogram is intended to provide more weight and improved resolution to frequency bands where the human auditory system has better resolution, thereby improving the ability to perform source separation for those frequencies. The human auditory system generally has a hearing range of 20 Hz to 20 kHz, although under ideal laboratory conditions the hearing range may be as wide as 12 Hz to 28 kHz. Thus, from a practical perspective for human listening, audio source separation is only relevant for frequencies in the human hearing range.

The non-linear interpolation that is applied by transform logic 114 may use one of many different interpolations based on the context of human auditory scales, sometimes referred to as psychoacoustic scales. Examples of such psychoacoustic scales include the mel scale, the Bark Scale, and/or the Equivalent Rectangular Bandwidth (ERB) scale. Thus, transform logic 114 may use one or more of these psychoacoustic scales to apply non-linear interpolation to the spectrogram.

In an embodiment, the spectrogram generated by transform logic 114 may be sent to audio source separation logic 116 for further processing. In another embodiment, the magnitude matrix and/or phase matrix generated by transform logic 114 may be sent to audio source separation logic 116 for further processing.

2.4 Audio Source Separation Logic

Server 102 includes audio source separation logic 116. Audio source separation logic 116 is programmed or configured to perform audio source separation. In one embodiment, audio source separation logic 116 takes a spectrogram or magnitude matrix of a spectrogram, analyzes it, and generates N output component signals representing the individual component signal fragments present in the spectrogram. A component signal can be any semantically meaningful element or pattern in the spectrogram, such as a musical instrument (e.g., piano, snare drum, bass drum, guitar, violin, etc.), a particular note of a musical instrument (e.g. each note of a piano may be a different instrument, each note of a violin may be a different instrument, etc.), a particular voice (e.g., for multiple human voices each voice may be a different instrument, etc.), or any other pattern that is identifiable in the spectrogram (e.g., sound of an explosion, an ambulance siren, etc.).

In an embodiment, audio source separation logic 116 is programmed or configured to perform identification and classification of component signals on the input spectrogram, builds a custom dictionary best suited for the input spectrogram, performs spectrogram decomposition using the custom dictionary to generate component spectrograms from the input spectrogram, and finally performs signal reconstruction on the component spectrograms to generate component signal fragments. The component signal fragments are audio samples and may be formatted as PCM sample fragments according to one embodiment. The component signal fragments may then be sent to concatenation, crossfading & buffering logic 118 for further processing.

In another embodiment, audio source separation logic 116 is programmed or configured to use one or more deep neural networks (DNNs) to perform audio source separation, instead of having to use a custom dictionary and spectral templates.

2.4.1 Identification and Classification of Candidate Component Signals

In one embodiment, audio source separation logic 116 is programmed or configured to perform identification and classification of component signals on the input spectrogram to identify one or more candidate component signals found in the input spectrogram. Audio source separation logic 116 may be communicatively coupled to training database 115. In one embodiment, training database 115 may be accessible to audio source separation logic 116 via an exposed application programming interface (API). Training database 115 is a repository of information that may assist in the identification, classification, and source separation of an audio signal.

For example, in one embodiment, training database 115 may store information regarding expected metadata for component signal identification. Audio source 105 may include various metadata. For example, an audio source 105 in an .MP3 format may include various metadata for a musical track, including, but not limited to title, artist, album, year, and genre. Other formats of audio source 105 may store different types of metadata. The metadata of an audio source 105 may be used to identify candidate component signals in the audio source 105. For example, an audio source that includes metadata indicating a "classical" musical genre is more likely to include musical instruments featuring violins and cellos. On the other hand, an audio source that includes metadata indicating a "rock" musical genre is more likely to include musical instruments featuring electric guitars and bass instruments. Training database 115 may include data that correlates audio source metadata to expected component signals in the audio source. Audio source separation logic 116 can thus use the stored data in training database 115 to identify candidate component signals in the audio source 105.

In another embodiment, audio source separation logic 116 may analyze the input spectrogram to identify candidate instruments. Training database 115 may store a training dictionary of reference spectral templates that can be used to identify candidate instruments in a spectrogram. A spectral template is a vector containing a specific spectral pattern of energy across different frequencies. A spectral template thus contains a specific statistical distribution of magnitude or energy across frequencies and thus represents a spectral signature of a specific sound in a semantic context. For example, a spectral template for a kick drum will concentrate higher energy in the low frequency area compared to a spectral template for a hi-hat cymbal, which will concentrate most of the energy in a high frequency range. The training database 115 may store a training dictionary of pre-stored reference spectral templates that each represents a signature of particular candidate component signal, such as a musical instrument, a note on a particular musical instrument, a chord on a particular musical instrument, a voice, and/or some other distinctive sound effect. For example, in one embodiment, a different spectral template may be stored for every note that can be played on a piano.

In one embodiment, audio source separation logic 116 may then use the spectral templates in training database 115 to identify and classify the component signals present in a particular input spectrogram. For example, in one embodiment, audio source separation logic 116 may use non-negative matrix factorization (NMF) to identify a subset of spectral templates from the training dictionary that are most often found in the input spectrogram. NMF is an algorithm in linear algebra to provide matrix factorization. In NMF, a matrix V is approximated by two smaller matrices W and H, which, when multiplied, approximately reconstruct V. Thus, in NMF, two or more submatrices are multiplied together to get a final matrix using the following equation: W*H=V. The NMF algorithm can be applied to this equation to determine one or both of the submatrices. In the present case, the input spectrogram is represented as V. The reference spectral templates in the training dictionary are represented as basis vectors that collectively make up matrix W. The NMF algorithm performs a number of iterations to estimate values for H so that when multiplied by the fix matrix W, best approximates the input matrix V. The number of iterations can be arbitrarily chosen or alternatively, can be dynamically set based on a predefined convergence criteria. The activations matrix H is a matrix that identifies which spectral templates of all the spectral templates in the training dictionary are activated at each timeframe and with which gain. This configuration is sometimes known as supervised NMF because the system provides the matrix W in the form of reference spectral templates, versus the pure version of NMF, where both W and H are randomly initialized and the algorithm estimates the values of both W and H.

In one embodiment, audio source separation logic 116 may further use correlation analysis on activations matrix H to identify which spectral templates of the ones identified have a minimum correlation with spectral templates from other families of component signals. For example, in one embodiment, the Pearson correlation coefficient may be used for to measure correlation between variables in a correlation analysis. A family of component signals may represent spectral templates that are interrelated. For example, each note for a piano keyboard may be represented by its own spectral template and the collection of all such notes may be the family of component signals. Templates corresponding to different drums sounds (e.g., kick drum, snare drum, hi-hat cymbal) can be another example of a family. A goal of the correlation analysis is to load a subset of spectral templates that are used consistently but that have minimum correlation with templates for other families. Minimum correlation means that there is more spectral dissimilarity between spectral templates from different families, therefore minimizing interference between the different families when later reconstructing signals. This correlation analysis directly impacts the quality of separation and it is a key step towards adaptive source separation, which takes into account statistics from the input combined signal itself.

The final result of the component signal identification and classification analysis by the audio source separation logic 116 is a selection of a subset of candidate spectral templates from training dictionary that are present and most commonly found in the input spectrogram while maximizing inter-family discrimination of templates by the algorithm for a given input combined signal.

2.4.2 Custom Dictionary Construction

In one embodiment, based on the information determined during instrument identification and classification, audio source separation logic 116 is programmed or configured to generate a custom dictionary of spectral templates. The custom dictionary of spectral templates describes the special characteristics of the component signals present in the current fragment of the input spectrogram. Thus, the custom dictionary can be used for source separation and reconstruction. The custom dictionary is a subset of all the spectral templates available in the training dictionary. By focusing on this subset of spectral templates instead of all spectral templates in the training dictionary, the audio source separation logic 116 can improve performance and limit its subsequent source separation and reconstruction processing to instruments present in the current fragment of the input spectrogram without having to process unnecessary spectral templates in the training dictionary, while maximizing inter-family discrimination of templates by the algorithm for a given input combined signal. The use of a custom dictionary will reduce interference caused by using an incorrect spectral template to model a component signal that does not belong to the same family. For example, using a using a drum spectral template to model part of the piano can cause unwanted interference.

2.4.3 Spectrogram Decomposition and Signal Reconstruction

In one embodiment, audio source separation logic 116 is programmed or configured analyze the spectrogram using an audio source separation algorithm based on NMF, decompose the spectrogram, and perform signal reconstruction of the component signals. As described earlier, in NMF, a matrix V is approximated by two smaller matrices W and H, which, when multiplied, approximately reconstruct V: W*H=V. In the context of spectrogram decomposition, the matrix V is the magnitude matrix of the spectrogram of the input fragment received from transform logic 114. Many other implementations of NMF may iteratively update both W and H to obtain the final approximation of V, however, in one embodiment of the present disclosure, a semi-supervised NMF implementation is applied instead. In a semi-supervised NMF implementation, the matrix W is dynamically constructed based on the custom dictionary of spectral templates that was previously calculated by audio source separation logic 116 and is left unchanged by the separation algorithm. W is a concatenation of the 1-dimensional spectral templates in the custom dictionary. The separation algorithm using NMF techniques thus only updates and iterates the matrix H. Once the separation algorithm converges for the NMF equation, the result is an activations matrix H.

In an embodiment, audio source separation logic 116 is programmed or configured to use the activations matrix H to reconstruct the component signals. In one embodiment, audio source separation logic 116 uses the activations matrix H to perform a direct reconstruction of the signals. In direct reconstruction, the reconstruction for each family of component signals is achieved by multiplying a subset of the columns of the W matrix from the separation algorithm by a corresponding subset of the rows of the H matrix. For example, in one embodiment, the W matrix includes 30 columns where columns 1-10 represent a drum family of spectral templates, column 11-20 represent a guitar family spectral templates, and columns 21-30 represent a piano family of spectral templates. Thus, in order to reconstruct the spectrogram corresponding to the drums, columns 1-10 of the W matrix and multiplied against rows 1-10 of the H matrix. This reconstructed spectrogram thus represents the drums musical instrument. The reconstructed magnitude matrix of the spectrogram can then then be used as an input to an Inverse Short Time Fourier Transform (ISTFT) to generate a reconstructed signal that represent the drums musical instrument, by combining the magnitude matrix with the phase matrix of the original mix. Similar processing can be performed for the guitar musical instrument and the piano musical instrument. Direct reconstruction gives better isolation of signals and less interference between signals at the expense of some distortion and coloring in the sound.

In another embodiment, audio source separation logic 116 uses the activations matrix H to perform a source filtering using a soft mask to reconstruct the signals corresponding to musical instruments. A soft mask is a filter matrix M that can be calculated as follows:

$$M = \frac{w_1 h_1^T}{\sum_{i=1}^{K} w_i h_i^T}$$

In this equation, $w_i$ and $h_i$ are the spectral templates and activations, respectively, corresponding to the $i^{th}$ source, where K denotes the number of component signals to be reconstructed. The filter matrix M can be applied to the original mixed signal's spectrogram to obtain the reconstructed component signals. Source filtering provides better quality of sound but may introduce greater interference between the component signals.

In one embodiment, audio source separation logic 116 is programmed or configured to use direct reconstruction for reconstructing individual component signals. In another embodiment, audio source separation logic 116 is programmed or configured to use source filtering for reconstructing the individual component signals. In another embodiment, audio source separation logic 116 is programmed or configured to combine both direct reconstruction source filtering to reconstruct individual component signals. In the combined approach, audio source separation logic 116 performs both direct reconstruction and source filtering in parallel and takes the weighted average of the reconstructed signals.

The final output of the audio source separation logic 116 is a series of 1 to N component signal fragments, each one corresponding to one musical instrument or other source identifier.

2.4.4 Deep Neural Networks (DNNs)

In an alternative embodiment, audio source separation by audio source separation logic 116 can be implemented using one or more deep neural networks (DNNs) instead of performing instrument identification and classification using NMF techniques, spectral templates, and custom dictionaries, as previously described. A deep neural network (DNN) is a type of artificial intelligence neural network that can be programmed or configured to learn to perform a task based on end-to-end learning techniques. In a DNN, multiple layers of computer-implemented artificial neurons are programmed or configured to emulate a biological neural network. A DNN may be used to process input data and generate an output. A DNN may be organized into multiple layers of artificial neurons that are connected to one another. Thus, in a DNN, the input layer and output layer may be connected via multiple intermediate layers. The artificial neurons of a DNN are connected to one another via links. The weight values of the connections between artificial neurons in each layer in the DNN may be modified based on a training dataset so that the DNN may be programmed or configured to learn the given task and improve performance in generating an output for a given input data. In this particular case, the DNN may be programmed or configured to learn component or instrument identification and classification.

Figure 7:
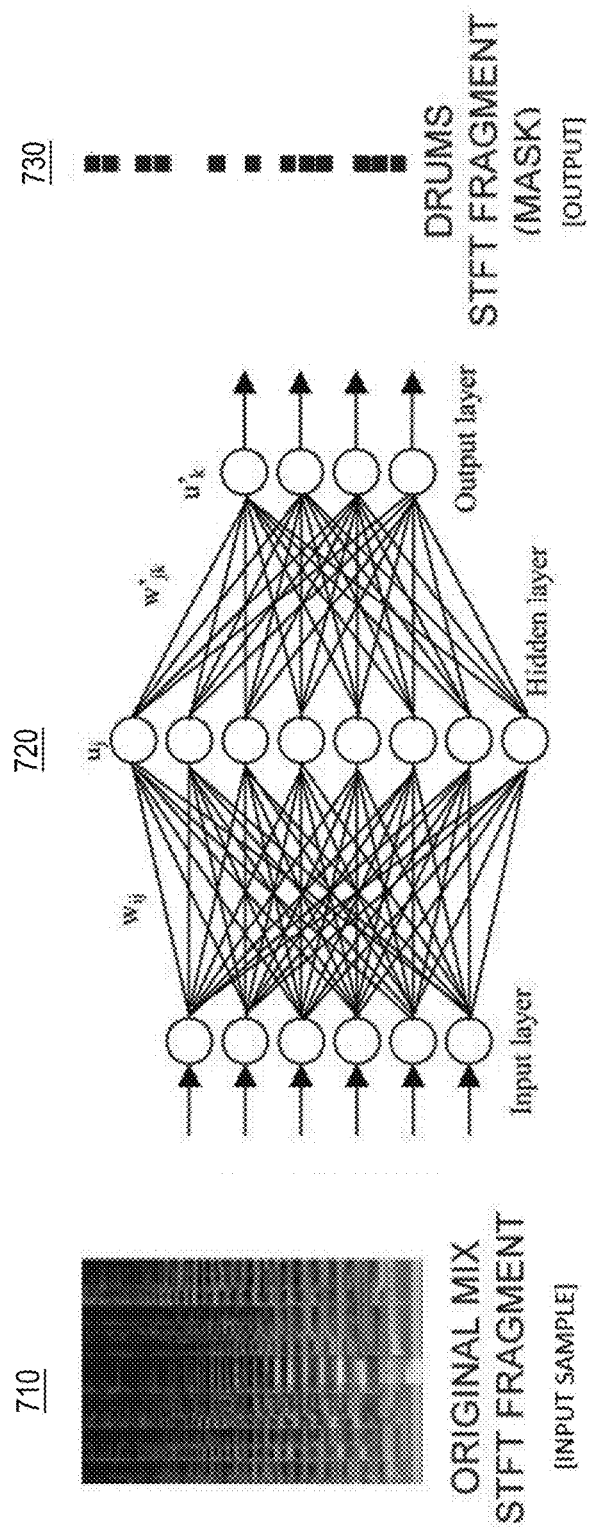
FIG. 7 depicts an example overview of generating a spectrogram component mask fragment by a deep neural network, according to one embodiment.

In an embodiment, audio source separation logic 116 is programmed or configured to perform audio source separation using one or more DNNs. A DNN may take as an input an input sample and generate an output based on that input sample that represents the audio source separation of the input sample. Thus, a DNN of audio source separation logic 116 is programmed or configured to take as an input an input sample that is a spectrogram fragment of the spectrogram received from transform logic 114. The trained DNN may process the input sample and generate an output, via its output layer, representing one or more spectrogram component fragment masks. FIG. 7 illustrates this example workflow for the audio source separation logic 116 for generating a spectrogram component fragment mask for a drums instrument from an original spectrogram fragment used as an input sample. In the example of FIG. 7, the input sample 710 is an original mix STFT fragment received in the input layer of the DNN 720 of audio source separation logic 116. The DNN 720 was previously trained on a training dataset to perform audio source separation. During inference, DNN 720 processes the input sample 710 received via its input layer over one or more intermediate hidden layers to generate an output 730 via its output layer. The output layer of DNN 720 then generates output 730 as a drums STFT fragment (mask) that represents audio source separation of the input sample 710.

2.4.4.1 DNN Input Sample

Input sample 710 is a set of data that is processed by a DNN to generate an output. In an embodiment, input sample 710 is a fragment of the spectrogram received by audio source separation logic 116 from transform logic 114. In an embodiment, input sample 710 may be taken on a down-sampled version of the original mix spectrogram. For example, as described earlier, the original sampling rate used by fragmentation logic 112 may be implemented to use a down-sampled sampling rate of 22,050 Hz. Using a down-sampled sampling rate improves computational efficiency of DNN performance by simplifying the input sample received at the input layer of the DNN 720, without compromising quality in a significant way. In an embodiment, the input sample received at the input layer of DNN 720 may represent a STFT of size 1024 with an overlap of 256 time domain samples. Thus, input sample of the DNN 720 may, in an embodiment, be a matrix with 513 rows and a fixed number of columns. The value of 513 rows in this example is arrived at because the Fast Fourier Transform (FFT) that is used to calculate the STFT is of size 1024. Since the FFT is symmetric, it is possible to only use the first half (512 rows) of the FFT plus the value of the DC component (a value of 1). Thus, the final result is 513 rows. In other embodiments, the number of rows used in the input sample may vary.

In an embodiment, the fixed number of columns of the input sample may be configured to cover a particular temporal period, so that the DNN 720 may be configured to take into consideration temporal context in the original signal based on frequency and/or time structure when performing audio source separation. In some embodiments, the temporal period for the input sample is configured to be between 300 and 600 milliseconds. For example, in one embodiment, the number of columns is 25, whereby 25 frames roughly equates to 300 milliseconds when the sampling rate is 22,050 Hz, and an STFT with an overlap of 256 time domain samples is taken.

2.4.4.2 DNN Inference

Figure 8A:
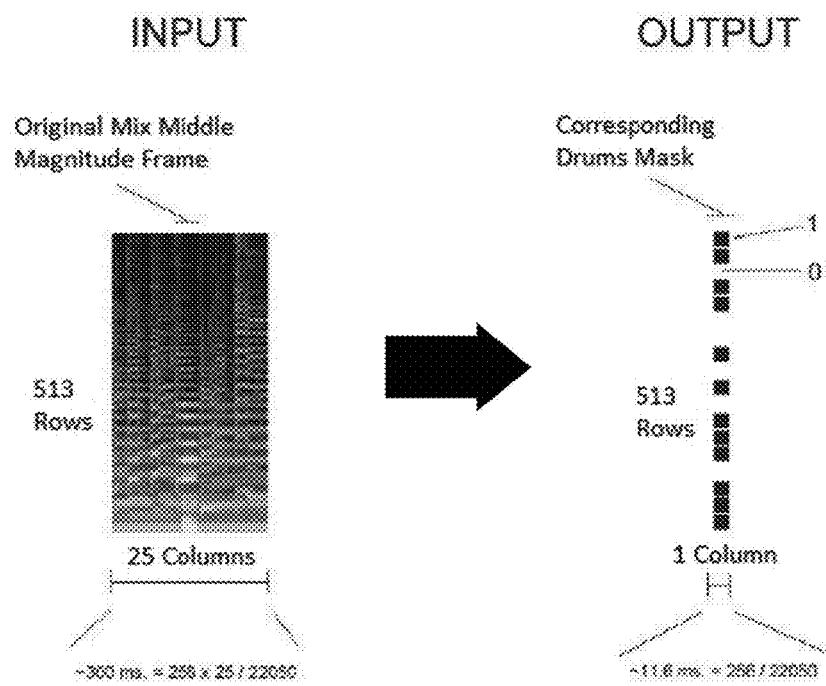
FIGS. 8A and 8B depict examples of processing an input sample to determine a binary mask for a frame of the input sample and using that binary mask to generate a component signal.

In one embodiment, as shown in FIG. 7, the output 730 of DNN 720 is a binary mask of a single frame of the input sample. The output 730 may be generated by DNN 720 based on inference. FIG. 8A illustrates an example of processing an input sample to determine a binary mask for a frame of the input sample. In the example of FIG. 8A, the input sample is a fragment of a spectrogram of the original mix. The input sample of FIG. 8A is a matrix of 513 rows and 25 columns. The 25 columns thus represent three different time periods in the spectrogram of the original mix fragment: the first 12 columns represent 12 frames of data that immediately precede the middle frame of the fragment, the single middle column represents the middle frame of the fragment from which we want to separate content from, and the last 12 columns represent 12 frames of data that immediately follow the middle frame of the fragment. In an embodiment, if any of the first 12 frames of data or last 12 frames of data are unavailable, such as at the beginning or the end of the original input audio source, the values of those frames can be zeroed out by the audio source separation logic 116.

The output of FIG. 8A is a binary mask of the corresponding component, which in this case is the drums instrument, at the time of the middle frame of the input sample. In an embodiment, each value of the output binary mask fragment is a binary value of zero or one. In one embodiment, the output of the DNN 720 may be a mask with values in the range between and including zero and one, which audio source separation logic 116 can binarize, using rounding or thresholding, to binary values of zero or one. A value of one in the output binary mask indicates the presence of the corresponding component at the particular frequency, as determined by the DNN. A value of zero in the output binary mask indicates the absence of the corresponding component at the particular frequency, as determined by the DNN.

Figure 8B:
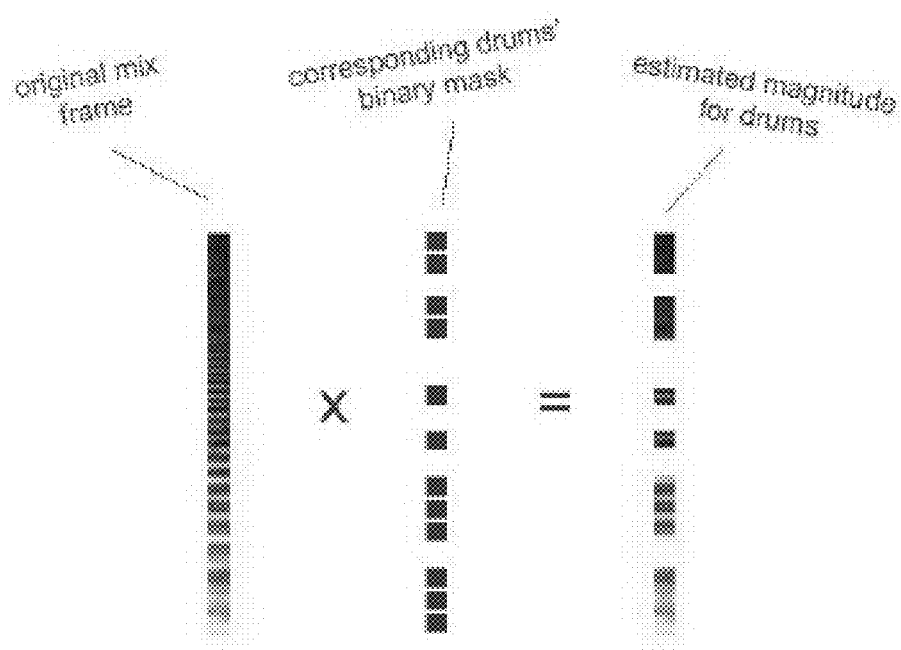

Once the binary mask for a given input sample is determined, such as in FIG. 8A, the component's estimated magnitude frame may be determined by multiplying the binary mask that is the output of the DNN with the original mix's magnitude middle frame, as shown in FIG. 8B. Thus, audio source separation logic 116 is programmed or configured to generate one or more binary masks for components in the spectrogram received from transform logic 114 using a trained DNN. Once audio source separation logic 116 has generated the binary mask(s), it may multiply the binary mask(s) with the original mix's magnitude frame(s) to generate the magnitude spectrogram for the component signals. In an embodiment, after the multiplication of the binary mask that is the output of the DNN with the original mix's magnitude frame, the audio source separation logic 116 is programmed or configured to reconstruct the estimated time domain signal of the component by combining the magnitude spectrogram with the original mix's phase information, and performing an inverse FFT to generate the time domain signal. This reconstructed estimated time domain signal is then sent to CCB logic 118. In an embodiment, the previously-described DNN inference of audio source separation logic 116 may be performed, at least in part, by one or more Graphics Processing Units (GPUs).

2.4.4.3 DNN Training

Prior to processing an audio source 104, the DNN(s) of audio source separation logic 116 need to be trained based on a training dataset (not depicted in FIG. 1). Note that the training database 115 depicted in FIG. 1 is different than the training dataset needed for training DNN(s). The training database 115 is used for processing audio signals using the previously-described NMF techniques and is not necessary for audio source separation using DNN(s). In an embodiment, a training dataset may include a plurality of input-output pairs, where each input-output pair includes an example input sample and output binary mask for a given component in a known audio source(s). The training dataset is prestored and may include thousands to millions of input-output pairs. Audio source separation logic 116 is programmed or configured to train the DNN(s) using the training dataset before processing new input received from audio source 105. The training of the DNN may, for example, use a backpropagation algorithm to adjust internal weights of the layers in the DNN to improve the DNN's ability to perform audio source separation when it receives new, unseen data.

In an embodiment, the DNN(s) of audio source separation logic 116 only need to be trained once, prior to performing inference for real-time audio source separation. In another embodiment, the DNN(s) may be continually trained and/or retrained based on new data added to the training dataset. In an embodiment, the previously-described DNN training of audio source separation logic 116 may be performed, at least in part, by one or more Graphics Processing Units (GPUs).

2.4.4.4 DNN Models

Figure 9:
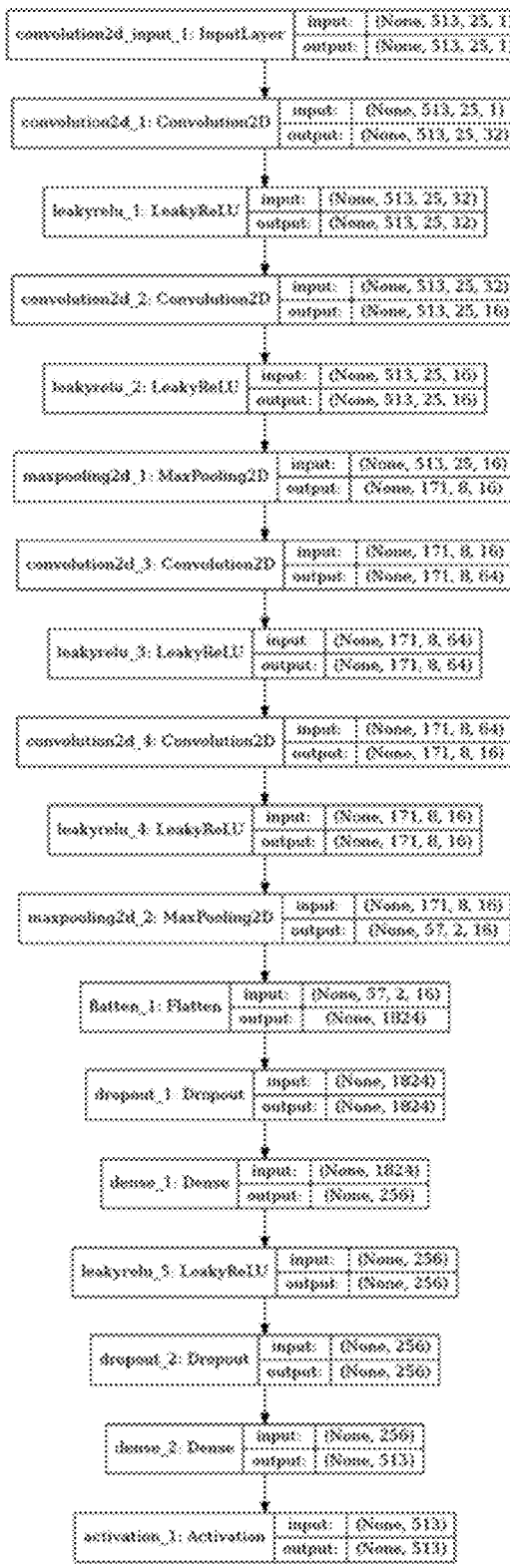
FIG. 9 depicts an example of a deep neural network architecture to separate a single stem or track from an input, according to one embodiment.

The structure of the model of the one or more DNN(s) of audio source separation logic 116 may vary according to different embodiments. The DNN of audio source separation logic 116 may be configured to include a combination of convolutional layers (CNN) and/or fully connected layers (FC). FIGS. 9, 10A, 10B, 11A, and 11B illustrate example embodiments of the structure of DNN of audio source separation logic 116 in different embodiments. The example embodiments of FIGS. 9, 10A, 10B, 11A, and 11B are merely illustrative to demonstrate the available concepts for organizing and structure of a DNN, and actual implementation of these concepts may omit layers, include additional layers, vary the sizes of the matrixes, reorganize the order of layers, or make other modifications to these general principles. Additionally, FIGS. 9, 10, and 11 are described with reference to four potential component signals in an input sample (e.g., DRUMS, BASS, MELODY, and VOCALS), however, different component signals, as well as a different number of component signals may be analyzed by audio source separation logic 116 in other embodiments.

FIG. 9 illustrates an example single stem model DNN implemented by audio source separation logic 116 for performing audio source separation, according to one embodiment. A single stem model DNN is programmed or configured to perform audio source separation for single component in a given input sample. Thus, if it is expected that there are four component signals in an input sample (e.g., DRUMS, BASS, MELODY, and VOCALS), four such DNNs would be needed, one for each component signal. The output of a single stem model is a one-dimensional binary mask (e.g., 513×1) for a given component, as described earlier. One benefit of a using a single stem model DNN is that the training of the DNN is specific to the component that is being identified by the particular single stem model DNN. Thus, if there is an error in training for identification of a second component signal, that error would not be propagated to the training for identification of a first component signal, as the first and second component signals would each be identified with different DNNs.

Figure 10A:
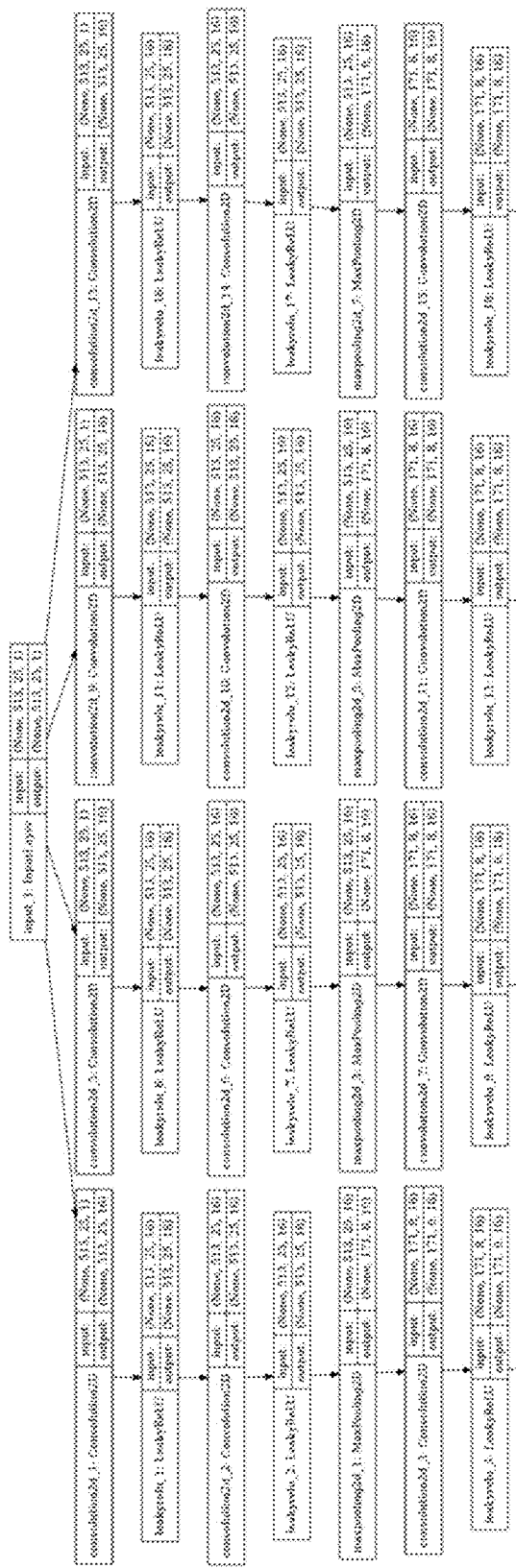
FIGS. 10A and 10B depict an example of a stacked model deep neural network, according to one embodiment.
Figure 10A:
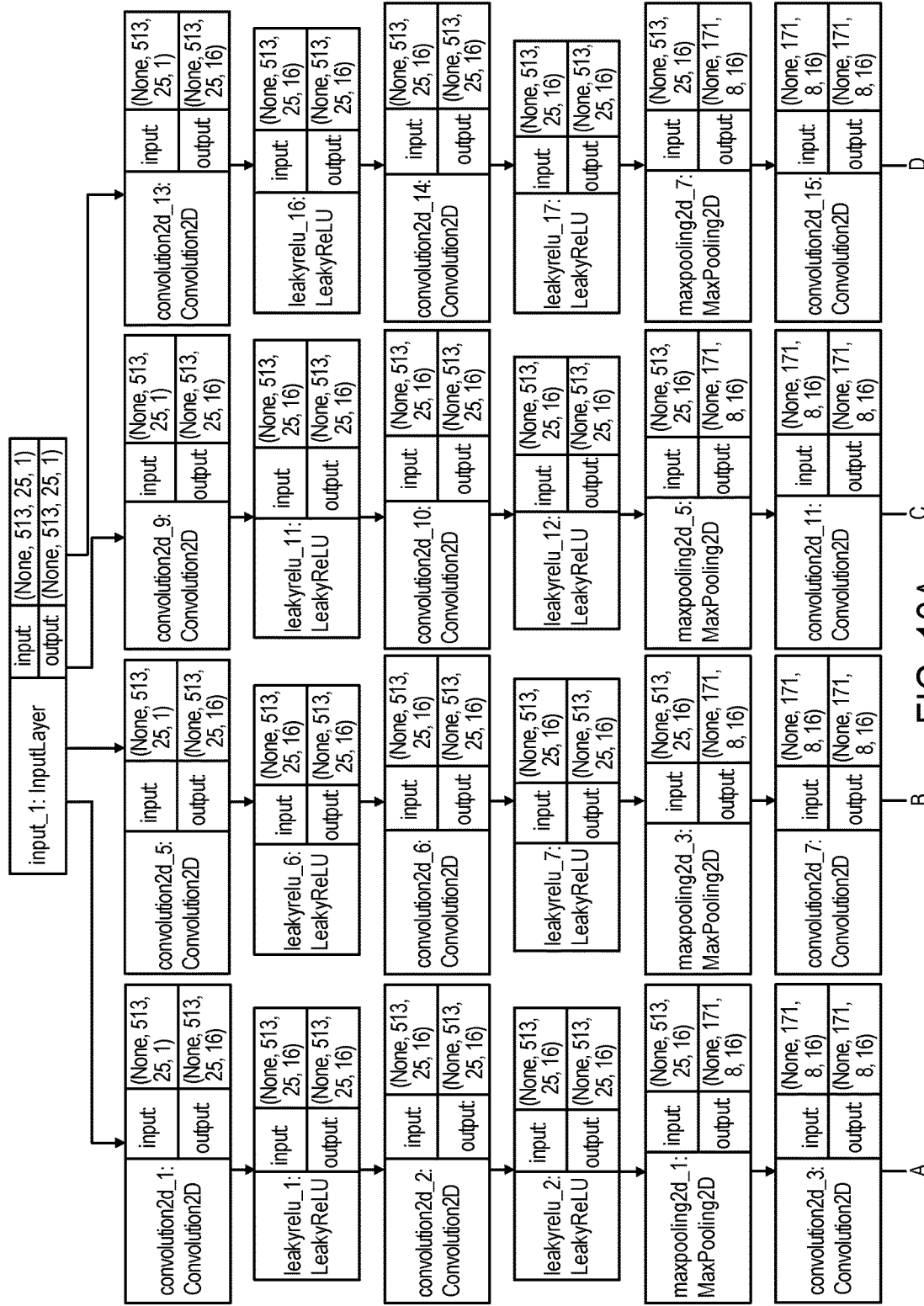
Figure 10B:
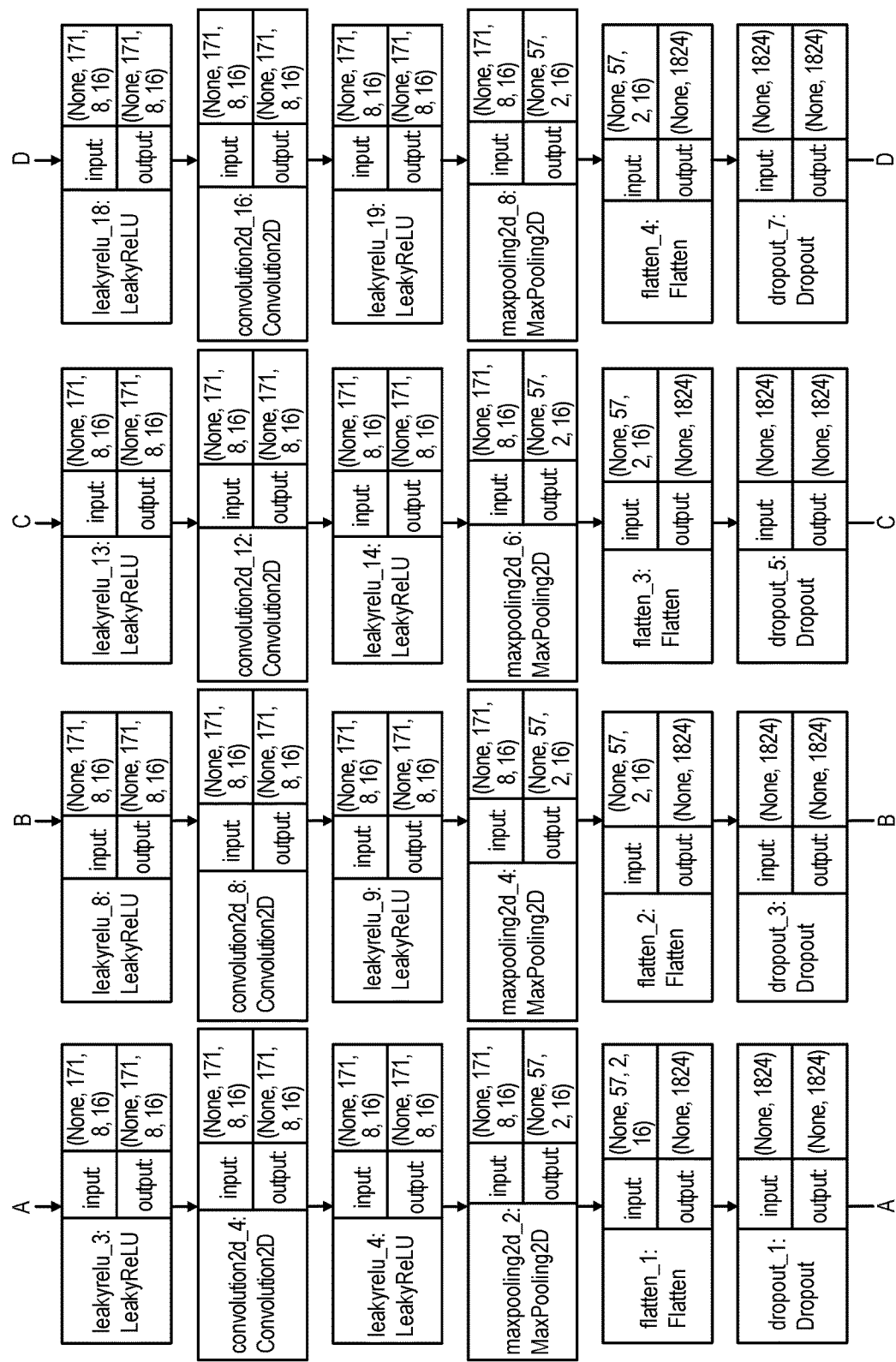
Figure 10B:
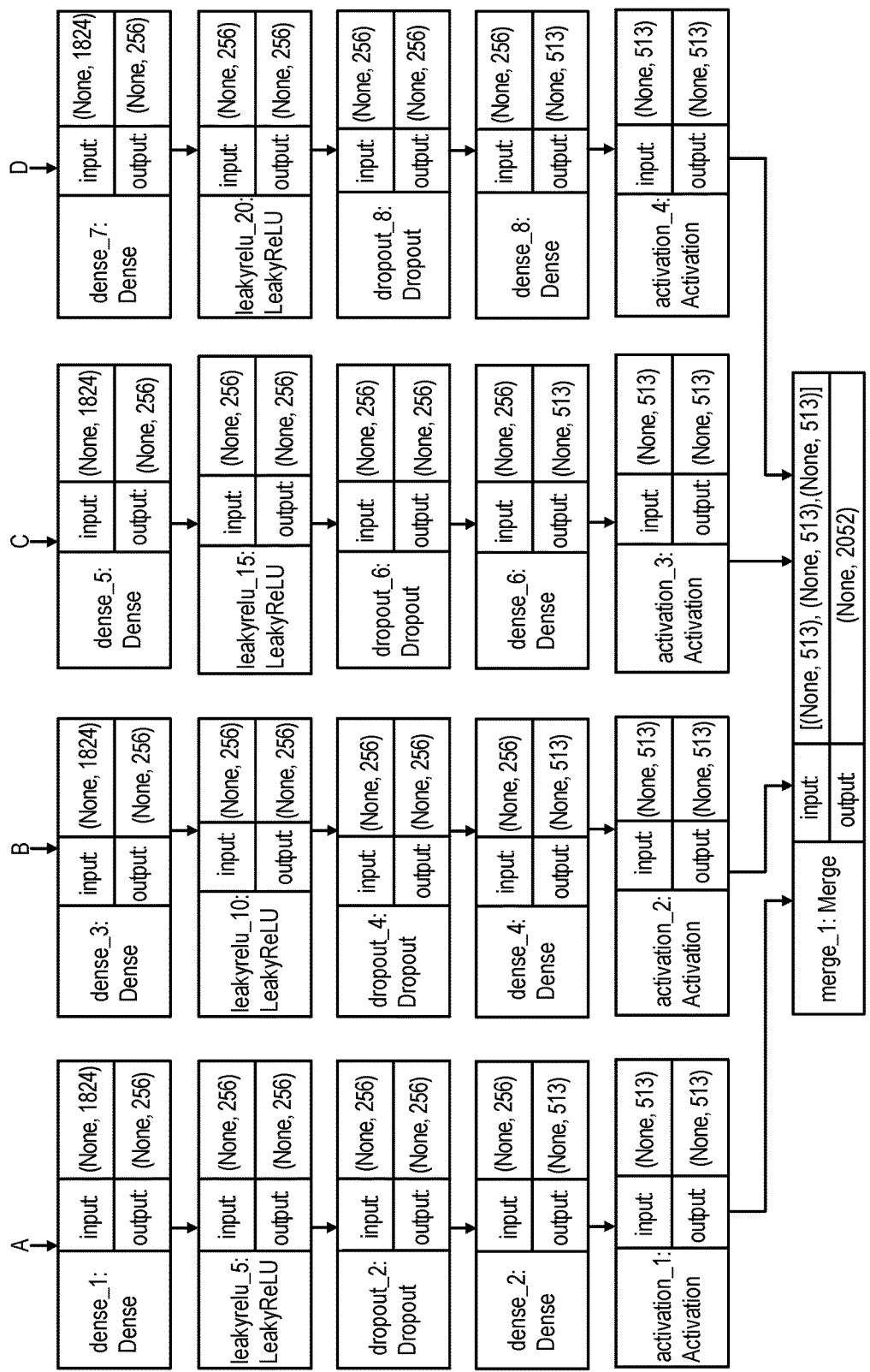
Figure 11A:
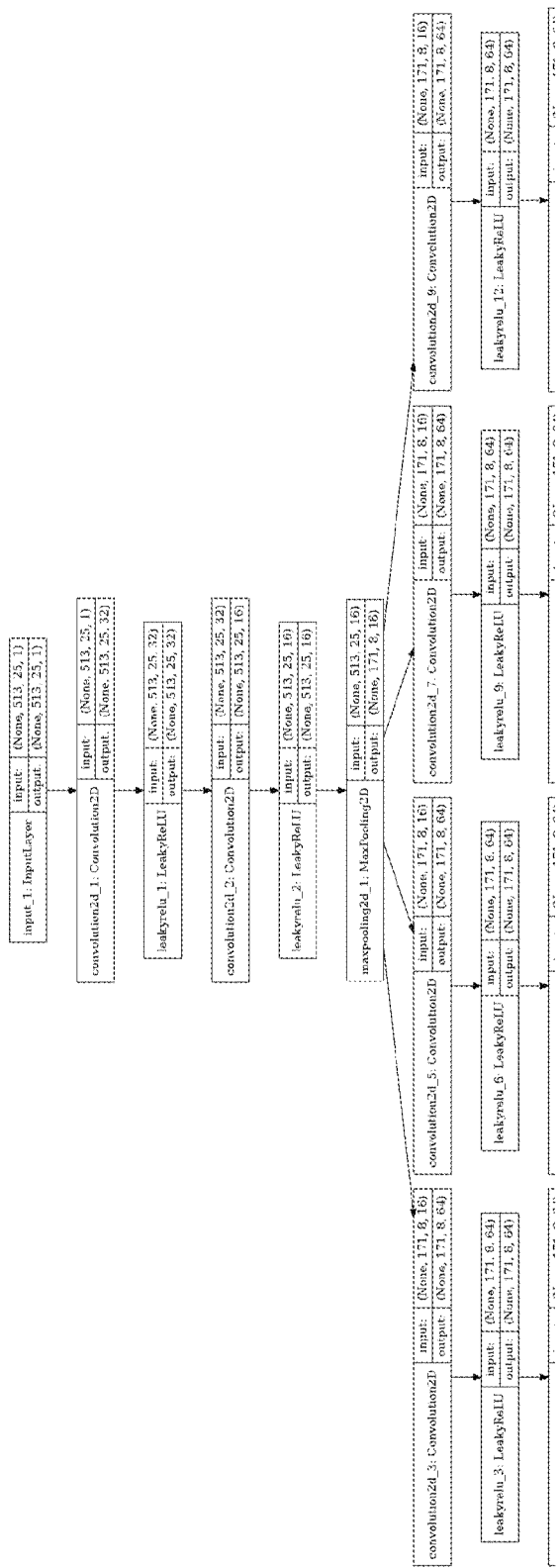
Figure 11B:
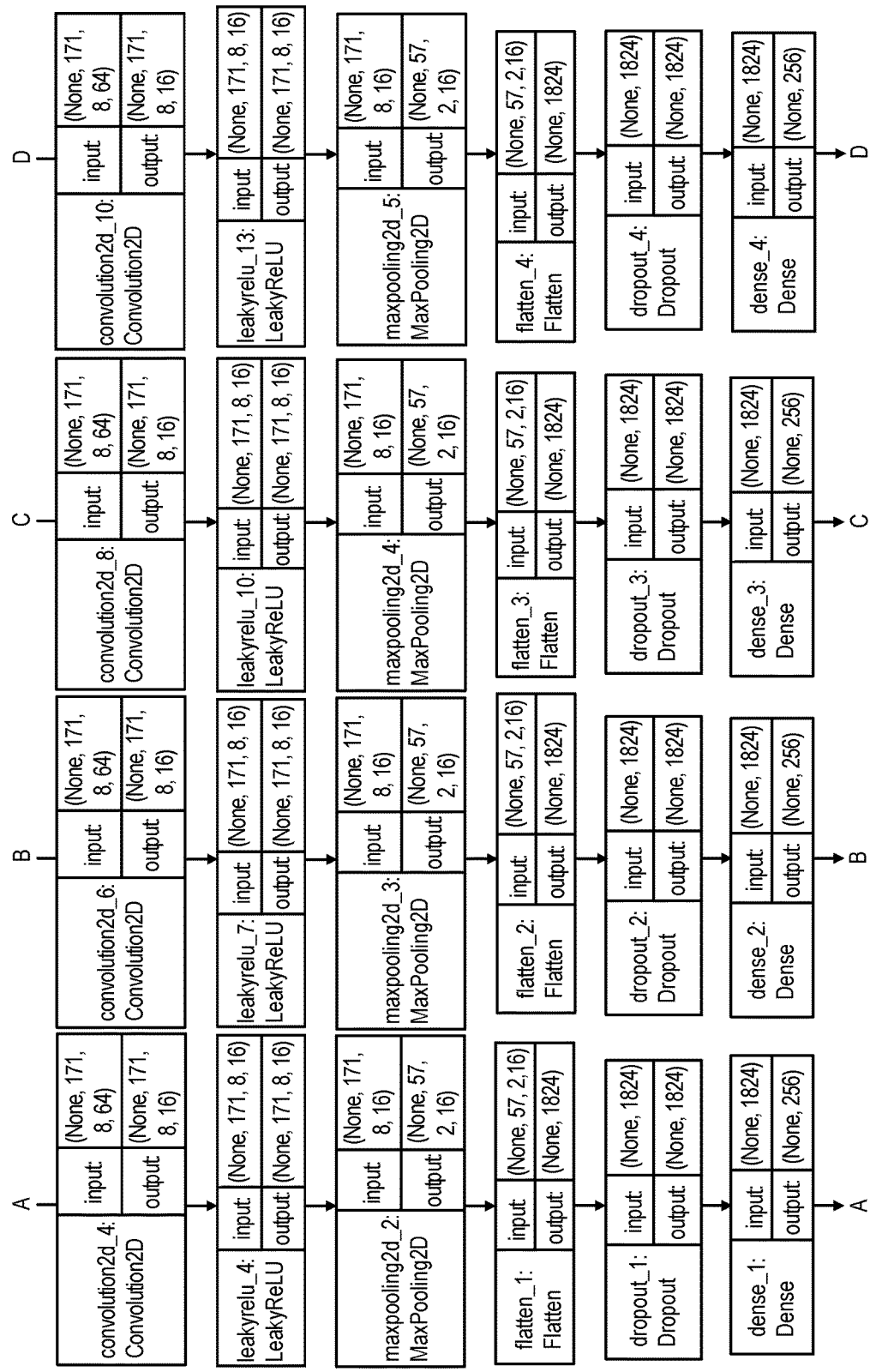
Figure 11B:
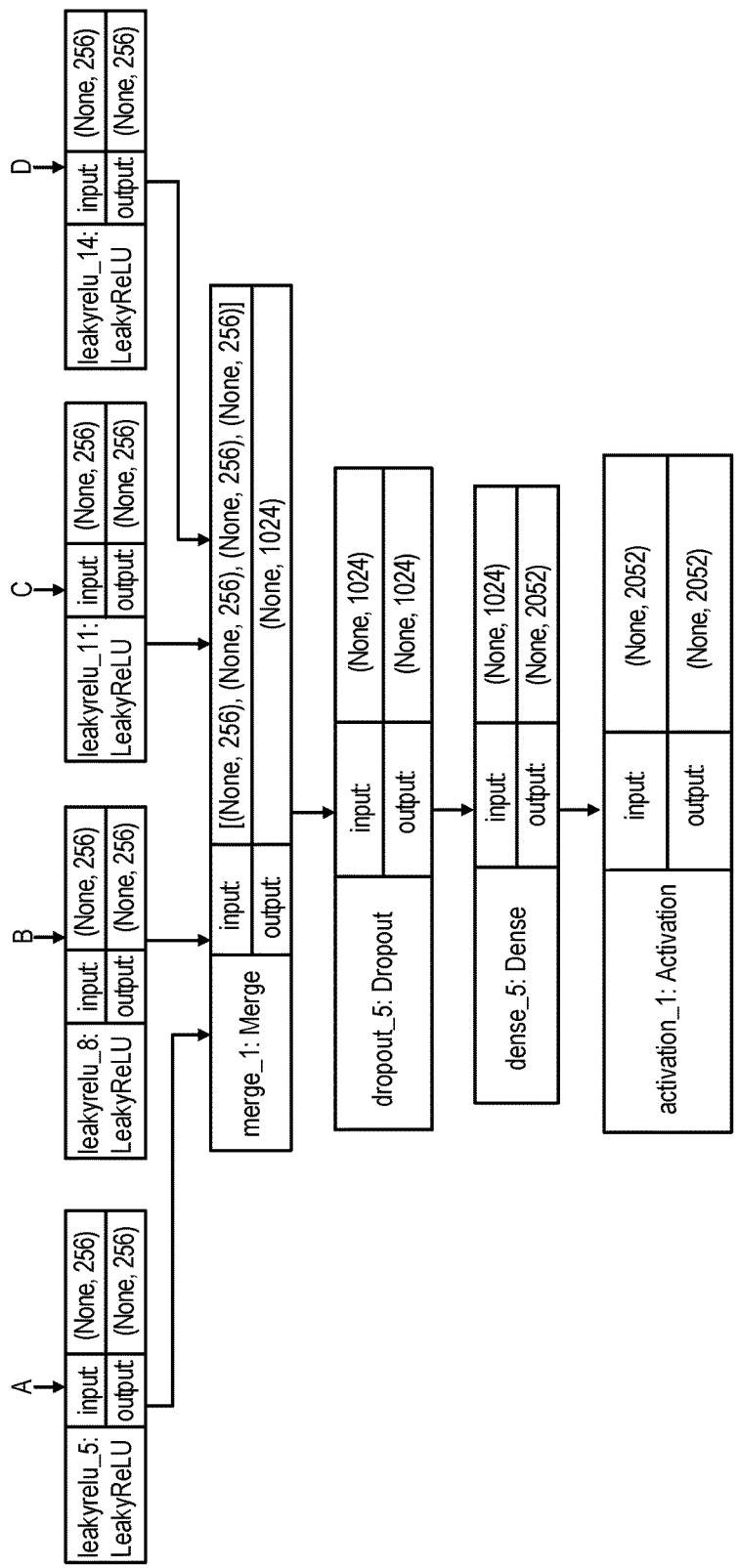

FIGS. 10A and 10B illustrate an example stacked model DNN implemented by audio source separation logic 116 for performing audio source separation, according to one embodiment. The stacked model of FIG. 10 is similar to the single stem model of FIG. 9, but in this case, the stacked model is a consolidated model that is trained to predict multiple components (e.g., DRUMS, BASS, MELODY, and VOCALS) in the input sample simultaneously. The stacked model thus illustrates a concatenation of multiple single stem models into a single DNN. The stacked model DNN will output a one-dimensional vector of size 2052 (e.g., 513×4). A stacked model may be an improvement over a single stem model as only a single stacked model DNN is necessary to be trained and maintained rather than training and maintaining multiple single stem model DNNs. On the other hand, a stacked model DNN means that multiple components are being considered by the same DNN, thus training via a backpropagation algorithm can result in multiple combined errors for all four stems of the stacked model. By comparison, in the single stem model, each DNN learns its own component with no visibility of influence on the other single stem models trained for other components.

Figure 11A:
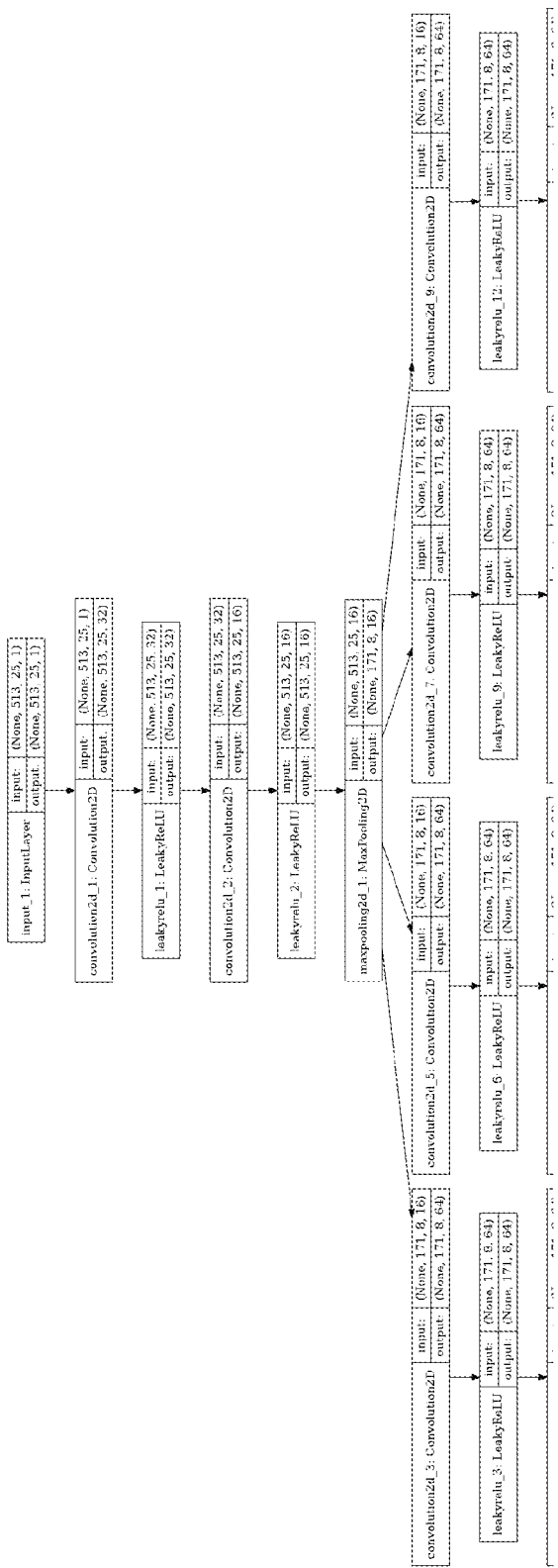
FIGS. 11A and 11B depict an example of a merged model deep neural network, according to one embodiment.
Figure 11B:
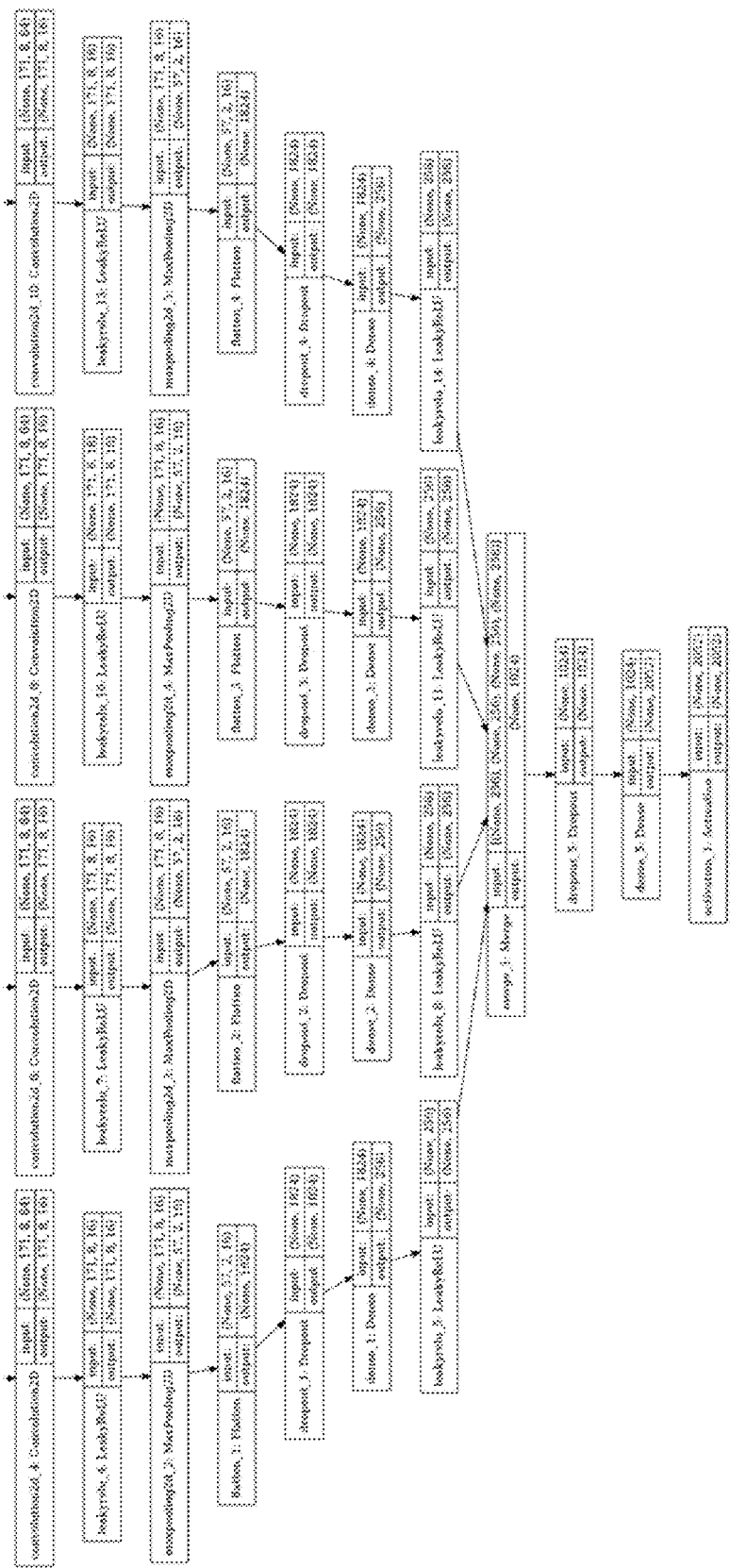

FIGS. 11A and 11B illustrate an example merged model DNN implemented by audio source separation logic 116 for performing audio source separation, according to one embodiment. The merged model DNN of FIG. 11 is a hybrid of the single stem model for five layers, but that subsequently branches into multiple components to train and learn components in parallel. The merged model DNN will output a one-dimensional vector of size 2052 (513×4) in the case of four components. The merged model of FIGS. 11A and 11B have similar benefits and tradeoffs as the stacked model of FIGS. 10A and 10B.

In FIGS. 9, 10A, 10B, 11A, and 11B, different types of layers of a DNN are described. Implementation of these types of layers may include variations, from embodiment to embodiment. An input layer of a DNN is programmed or configured to receive input values from an input sample. An example of an input layer is the "InputLayer" depicted in FIGS. 9, 10A, 10B, 11A, and/or 11B.

A convolution layer of a DNN is programmed or configured to perform a mathematical convolution of values. An example of a convolution layer is the "Convolution2D" layer depicted in FIGS. 9, 10A, 10B, 11A, and/or 11B.

A rectified linear unit or "ReLU" layer of a DNN is programmed or configured to perform a rectifier activation function. In an embodiment, the purpose of a ReLU is to introduce non-linearity to the DNN. Examples of ReLUs include Noisy ReLUs, Leaky ReLUs, and exponential linear units ("ELUs"). An example of a ReLU layer is the "LeakyReLU" layer depicted in FIGS. 9, 10A, 10B, 11A, and/or 11B.

A pooling layer of a DNN is programmed or configured to reduce the dimensionality of the feature map while maintaining the most important information. Spatial pooling can be implemented using different techniques, such as taking a maximum value, average value, summed value, etc., of a spatial neighborhood, such as a 2×2 window, of a matrix. An example of a pooling layer is the "MaxPooling2D" layer depicted in FIGS. 9, 10A, 10B, 11A, and/or 11B.

A flatten layer of a DNN is programmed or configured to transform a multidimensional representation of data into a simpler format, such as a lower-dimension or single-dimension representation. An example of a flatten layer is the "Flatten" layer depicted in FIGS. 9, 10A, 10B, 11A, and/or 11B.

A dropout layer of a DNN is programmed or configured to minimize overfitting of a DNN by dropping out values, for example, during training of the DNN. An example of a dropout layer is the "Dropout" layer depicted in FIGS. 9, 10A, 10B, 11A, and/or 11B.

A dense layer of a DNN is programmed or configured to apply a linear function on the input data of the layer. An example of a dense layer is the "Dense" layer depicted in FIGS. 9, 10A, 10B, 11A, and/or 11B.

An activation layer of a DNN is programmed or configured to apply a non-linearity on the input data of the layer. An example of an activation layer is the "Activation" layer depicted in FIGS. 9, 10A, 10B, 11A, and/or 11B.

A merge layer of a DNN is programmed or configured to merge values from different layers together. An example of a merge layer is the "Merge" layer depicted in FIGS. 10A, 10B, 11A, and/or 11B.

2.5 Concatenation, Crossfading & Buffering (CCB) Logic

Figure 2:
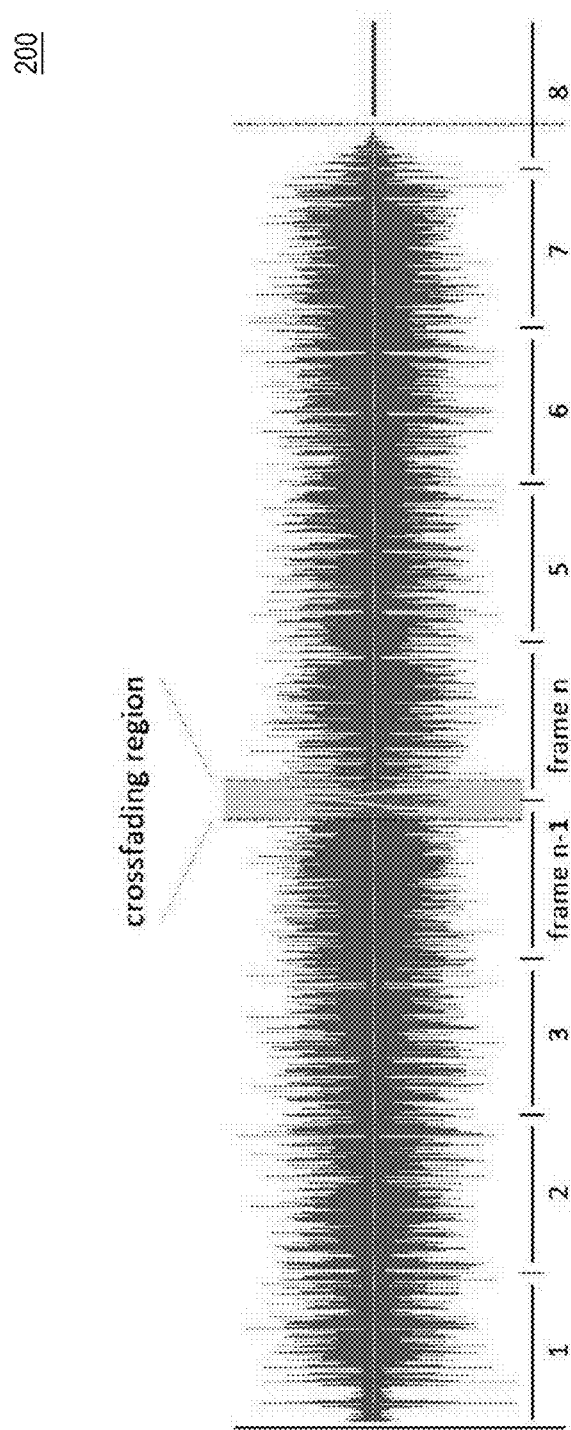
FIG. 2 depicts an example of cross-fading component signal fragments, according to one embodiment

Server 102 may include concatenation, crossfading & buffering (CCB) logic 118 that is programmed or configured to concatenate subsequent component signal fragments for a particular component signal, crossfade between component signal fragments and buffer each individual component signal. CCB logic 118 receives each fragment for a given component signal and concatenates them into a dedicated buffer, each corresponding to a particular component signal, such as a musical instrument. Since the separation is done on independent fragments of the component signal, a direct concatenation of the separated signal fragments might create audible discontinuities in the separated signal during playback. In order to avoid that undesired effect, a cross-fading mechanism is applied to these fragments prior to the concatenation, which avoids the audible discontinuity. FIG. 2 illustrates an example signal 200 for a particular musical component signal where a crossfading effect is applied between fragments. In signal 200, frame n corresponds to a component signal fragment for a particular musical instrument, and frame n−1 represents the next subsequent component signal fragment for the particular musical instrument. A crossfading algorithm is applied to smooth the overlapping region between frame n and frame n−1, thereby improving signal quality. The resulting output of the CCB logic 118 is a series of N audio signals where each signal corresponds to a component signal of the audio source 105.

2.6 Local Buffering Logic

In an embodiment, client 104 includes local buffering logic 120 that receives the N component audio signals from CCB logic 118 and buffers them locally in preparation for audio playback.

2.7 Semantic Equalizer GUI

Figure 3:
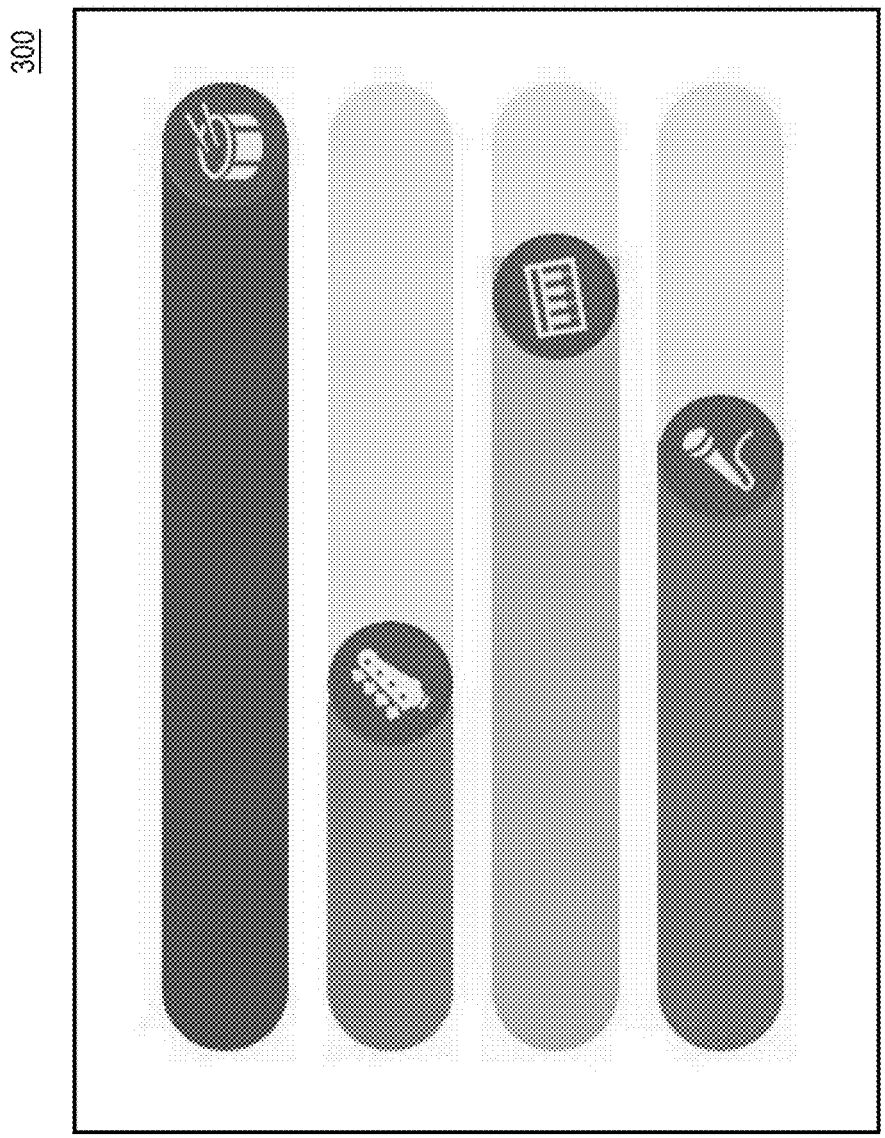
FIG. 3 depicts an example graphical user interface for manipulating component signals, according to one embodiment.

Client 104 may be communicatively coupled to semantic equalizer graphical user interface (GUI) 122. Semantic equalizer GUI 122 allows a user to manipulate the gain(s) applied to each component audio signal. FIG. 3 illustrates an example of the semantic equalizer GUI 300, according to one embodiment in the musical context. Each volume fader in semantic equalizer GUI 300 corresponds to one component signal. For example, in this example, each volume fader corresponds to a musical instrument, in this case "Drums", "Bass guitar", "Strings" and "Vocals". In this example, semantic equalizer GUI 122 can receive one or more user inputs, such as touch gesture, mouse gesture, or keyboard input to modify a gain level applied to a particular component audio signal such as a signal that corresponds to a musical instrument. By modifying the component audio signal, the fader's current value can be used to multiply the corresponding component audio signals stored in the local buffers. Moreover, since each instrument is itself stereo, meaning it has a right channel and a left channel and the addition is done channel-wise, this leads to a stereo mix.

2.8 Aggregation Logic

Client 104 includes aggregation logic 124 that is programmed or configured to take the component audio signals modified by gains, and aggregate them into a new stereo audio mixture in which the amount or presence of each instrument is regulated by the values of the faders in the semantic equalizer GUI 122.

2.9 Playback Engine

Client 104 includes a playback engine 126 that is programmed or configured to provide playback of the final stereo audio mixture. In one embodiment, playback engine 126 may be implemented, for example, via a web client, a native mobile application, a virtual reality audio system, or any other audio output device.

2.10 Application Areas

The present invention can separate an audio signal incrementally while it is being captured, which makes the technology suitable to be used with audio that is being streamed over the internet or signals that are being captured in real time. The invention achieves this by automatically dividing the input signal into smaller pieces, separating each piece independently and then recombining the individual outputs. This parallelized implementation provides the ability to perform audio source separation in real-time with no delays and minimal computing power.

3.0 Example Processes and Algorithms

Figure 4:
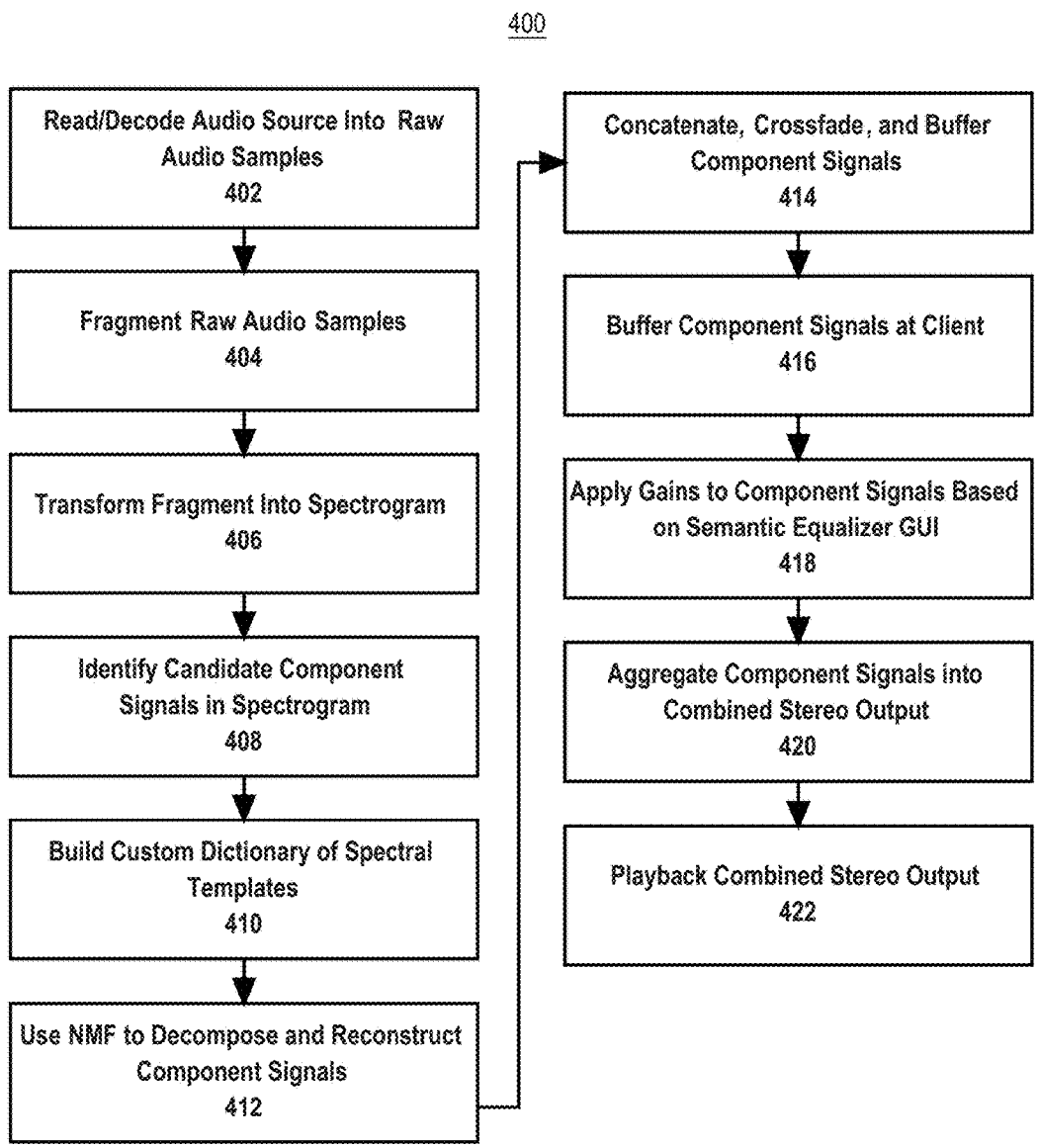
FIG. 4 illustrates a flow diagram for real-time audio source separation, according to one embodiment.

FIG. 4 illustrates a flow diagram of an example process 400 for real-time audio source separation using audio source separation system 100, according to one embodiment. FIG. 4 is intended to disclose an algorithm or functional description that may be used as a basis of writing computer programs to implement the functions that are described herein and which cause a computer to operate in the new manner that is disclosed herein. Further, FIG. 4 is provided to communicate such an algorithm at the same level of detail that is normally used, by persons of skill in the art to which this disclosure is directed, to communicate among themselves about plans, designs, specifications and algorithms for other computer programs of a similar level of complexity.

The process 400 may start at step 402. At step 402, reading/decoding logic 110 is programmed or configured to read an audio source 105 that represents a combined audio signal comprising a plurality of component audio signals. The audio source 105 may be formatted in any available audio format. In an embodiment, reading/decoding logic 110 is programmed or configured to generate a raw audio sample based on audio source 105. For example, in one embodiment, reading/decoding logic 110 may use one or more decoders to decode audio source 105 into raw audio samples. A raw audio sample is an audio sample taken in the time domain, such as a PCM sample. The reading/decoding logic 110 sends the generated raw audio samples to fragmentation logic 112. The process 400 may then proceed to step 404.

In step 404, fragmentation logic 112 is programmed or configured to fragment the raw audio samples received from reading/decoding logic 110. Fragmentation logic 112 may use a preconfigured fragment size to fragment the raw audio samples into a plurality of audio fragments. In one embodiment, each audio fragment may represent greater than or equal to 1.5 seconds of audio and less than or equal to 3.0 seconds of audio. The fragmentation of the raw audio samples into audio fragments is necessary to allow the audio source separation system 100 to process the audio source 105 in real-time and allow for early playback while a given track is still being captured and/or processed. The fragmentation logic 112 sends each audio fragment to transform logic 114 for further process. The process 400 may then proceed to step 406.

In step 406, transform logic 114 is programmed or configured to transform audio fragments into a spectrogram. For each audio fragment of raw audio samples received from fragmentation logic 112, transform logic 114 can apply a transform function to the audio fragment to generate a spectrogram. For example, in one embodiment, transform logic 114 can apply a Short-Time Fast Fourier Transform function to a fragment to generate a spectrogram. In an embodiment, transform logic 114 may optionally be further programmed or configured to apply non-linear interpolation to the spectrogram to provide more weight and improved resolution to the auditory frequencies in the human auditory range. For example, in one embodiment, transform logic 114 may perform non-linear interpolation to the spectrogram using the mel scale, which is one well known psychoacoustic scale for the human auditory range. The resulting spectrogram is sent to audio source separation logic 116. In an embodiment, a magnitude matrix and/or phase matrix of the spectrogram is sent to the audio source separation logic 116. The process 400 may then proceed to step 408.

In step 408, audio source separation logic 116 is programmed to identify candidate component signals in a spectrogram. In one embodiment, audio source separation logic 116 may compare metadata from audio source 105 to a set of metadata in training database 115 to identify one or more candidate component signals likely to exist in the spectrogram. In another embodiment, audio source separation logic 116 is programmed or configured to use a training dictionary comprising a plurality of reference spectral templates for known component signal in a NMF analysis to identify the candidate component signals present in the input spectrogram. In one embodiment, audio source separation logic 116 may programmed or configured to use correlation analysis to identify the component signals in the spectrogram with minimum correlation with spectral templates from other families of component signals. The final result of this analysis is a selection of candidate spectral templates from the training dictionary that are present in the spectrogram and most commonly found in the spectrogram, while minimizing inter-family correlation between templates, thereby minimizing the resulting interference after reconstruction of the sources. The process 400 may then proceed to step 410.

In step 410, the audio source separation logic 116 is programmed or configured to build a custom dictionary of spectral templates for the spectrogram. The custom dictionary thus includes the spectral templates for the candidate component signals identified in the prior step. The process 400 may then proceed to step 412.

In step 412, the audio source separation logic 116 is programmed or configured to use NMF to decompose the magnitude matrix of the spectrogram and reconstruct the component signals. The source separation algorithm uses the custom dictionary and the spectrogram along with NMF to decompose the spectrogram into an activations matrix H. In an embodiment, activations matrix H is a matrix of concatenated spectral templates that represent the individual component signals of the input spectrogram. Audio source separation logic 116 then can use this activations matrix H to reconstruct the component spectrograms of the input spectrogram. In one embodiment, audio source separation logic 116 uses direct reconstruction to generate the component spectrograms, and then uses Inverse Short Time Fourier Transform (ISTFT) to generate the component signal fragments for each component spectrogram. In another embodiment, audio source separation logic 116 uses source filtering using a soft mask to generate the component signal fragments. In another embodiment, both direct reconstruction and source filtering are performed in parallel to generate intermediate component signal fragments, which are then used to generate a weighted average for the final component signal fragments. The reconstructed component signals fragments may then be sent to CCB logic 118 for further processing. The process F00 may then proceed to step 414.

In step 414, CCB logic 118 is programmed or configured to concatenate the input component signal fragments for each component signal. For example, component signal fragment stream 1 may include component signal fragments for a piano. Each fragment in the component signal fragment stream 1 may be concatenated with one another to generate a full stream for the piano. In one embodiment, CCB logic 118 is programmed to perform crossfading to smooth out the fragments of a reconstructed component signal. In one embodiment, CCB logic 118 may buffer the individual components signals 1 through N. CCB logic 118 may be programmed or configured to send the component signals to client 104. The process 400 may then proceed to step 416.

In step 416, the local buffering logic 120 receives the individual component signal streams from CCB logic 118 and buffers them locally at the client 104 for local playback. The process 400 may then proceed to step 418.

In step 418, semantic equalizer GUI 122 may be used to receive user input on a volume fader to modify the gains to a particular component signal. By modifying the fader's value for a component signal on the semantic equalizer GUI 122, the gain level of the corresponding component signal is modified to multiply the corresponding component signal received from local buffing logic 120. The modified component signals are then received at aggregation logic 124. The process 400 may then proceed to step 420.

In step 420, aggregation logic 124 is programmed or configured to receive the component signals modified by gains and aggregate them into a new stereo audio mixture, where the presence of each component signal is regulated by the values of the faders in the semantic equalizer GUI 122. The process 400 may then proceed to step 422.

In step 422, the playback engine 126 is programmed or configured to play back the final stereo audio mixture provided by aggregation logic 124. The process 400 may then end.

Figure 12:
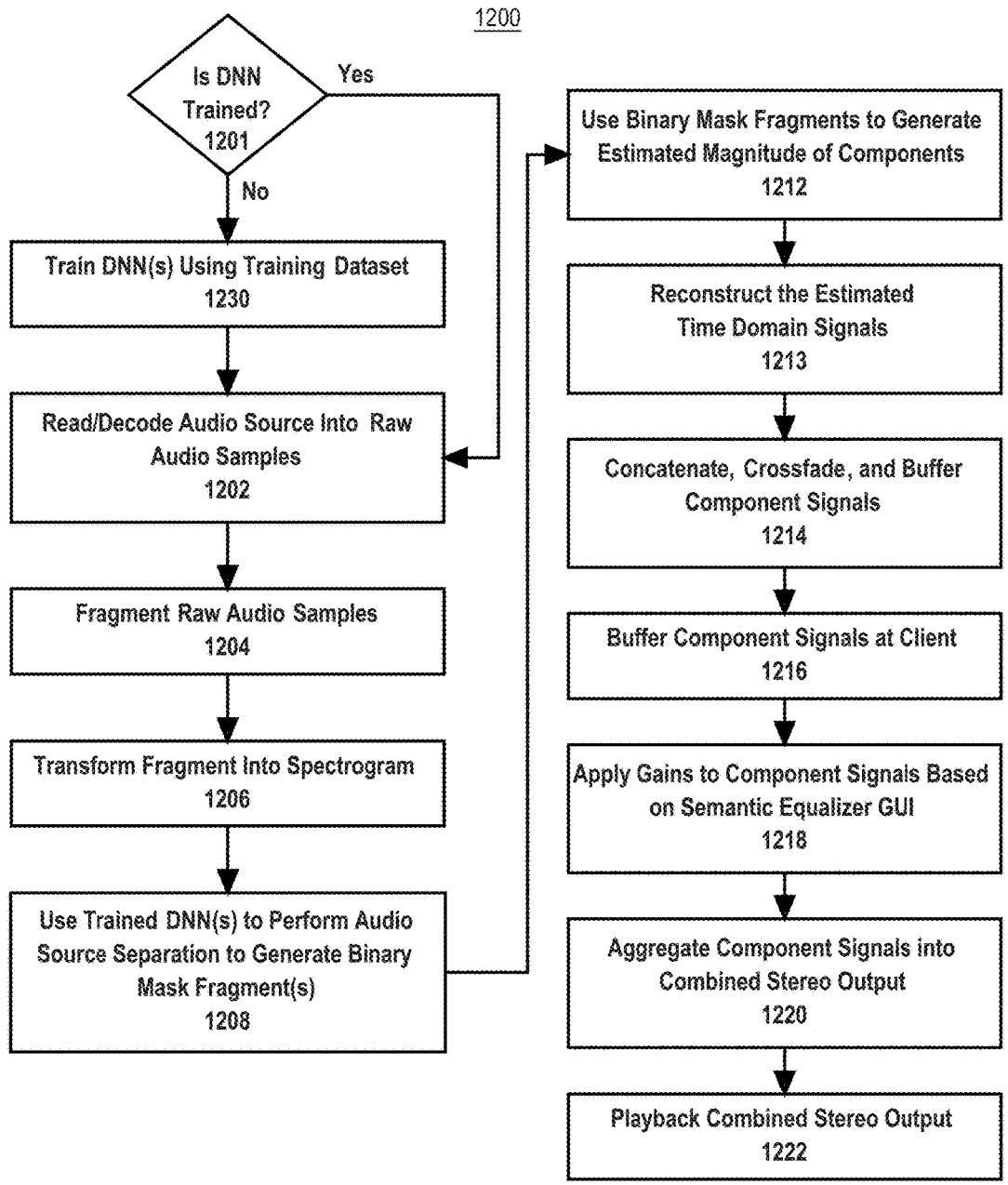
FIG. 12 illustrates a flow diagram for real-time audio source separation using deep neural networks, according to one embodiment.
Figure 1:
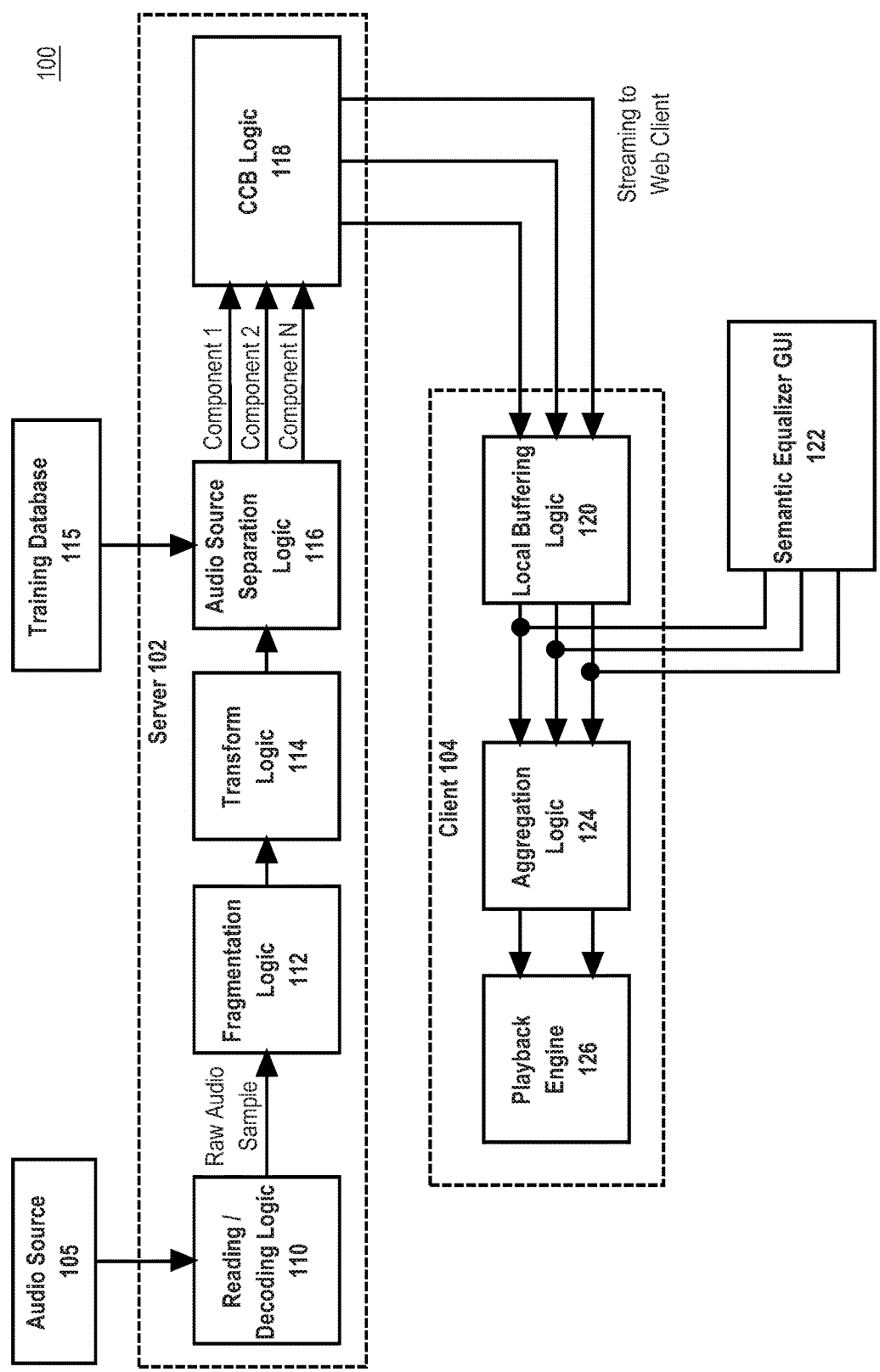
Figure 2:
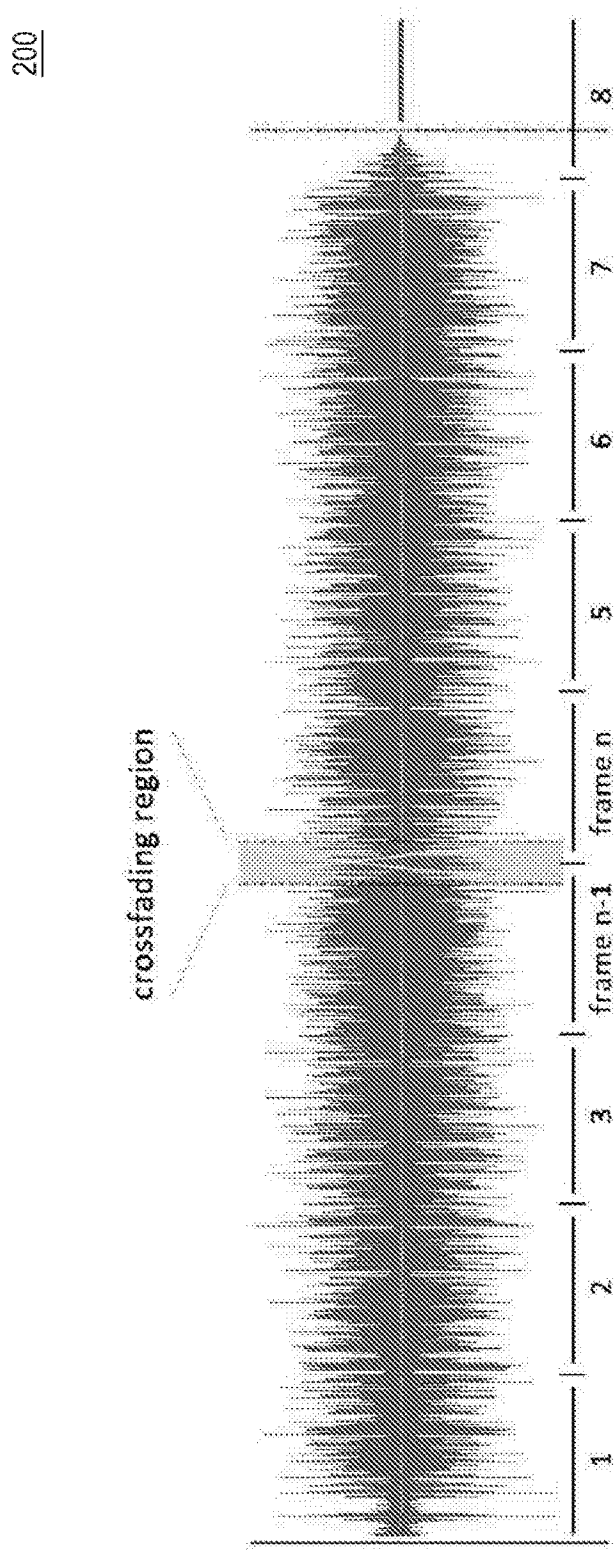
Figure 3:
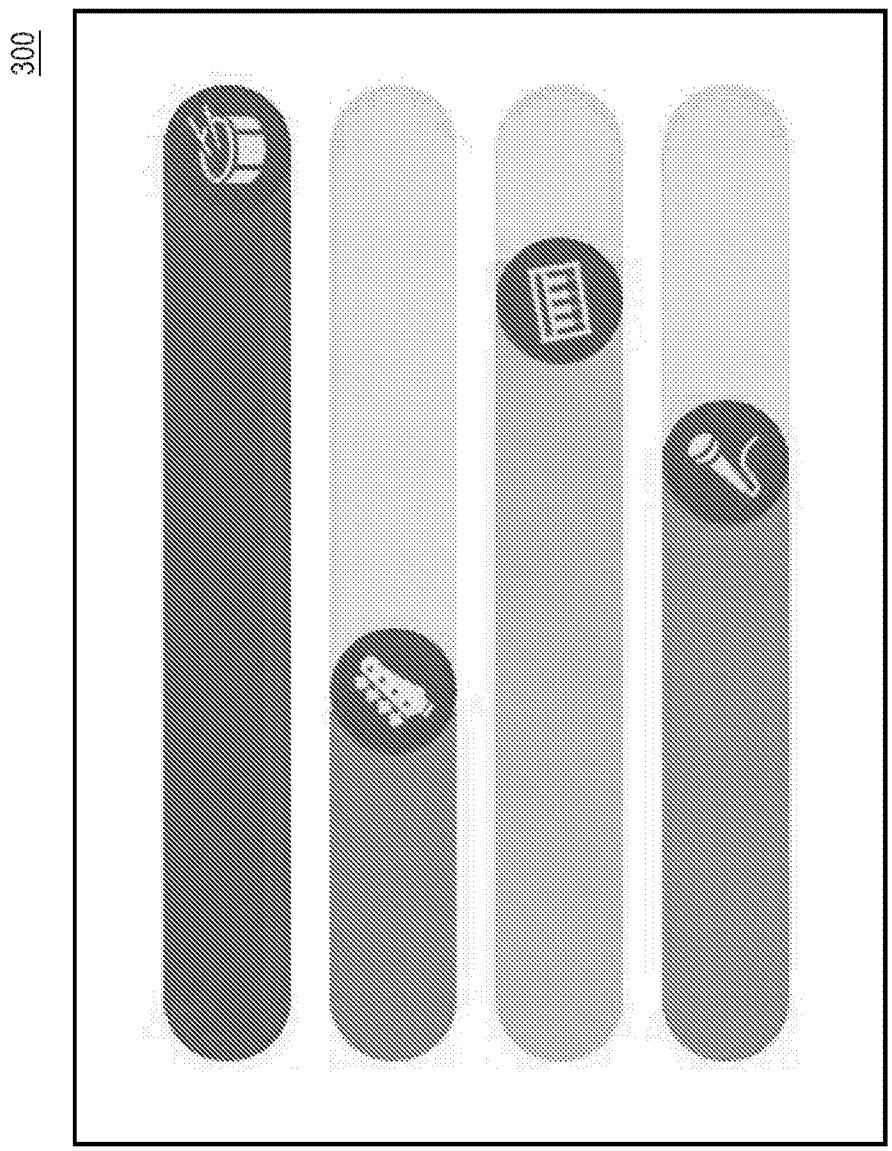
Figure 4:
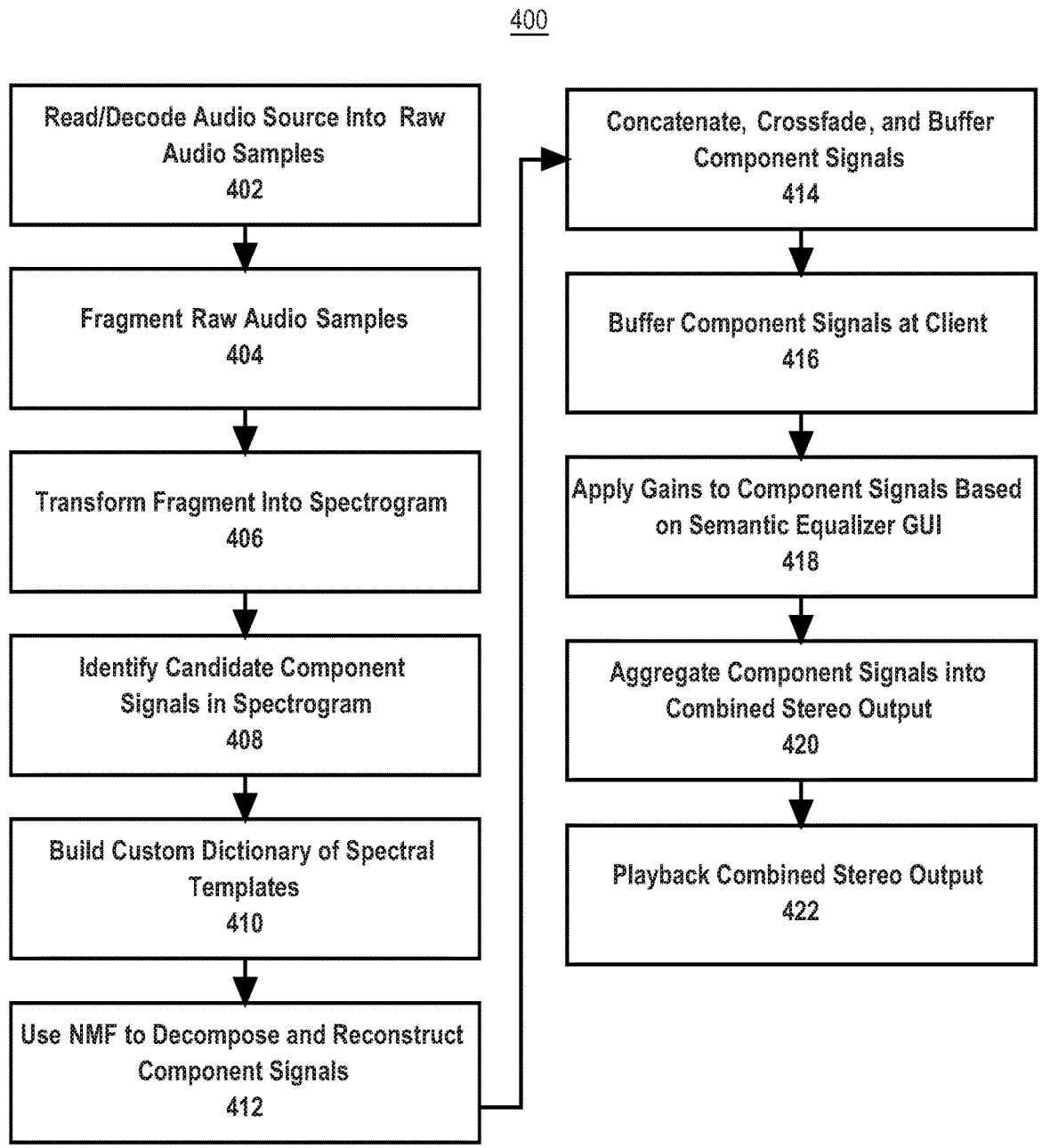
Figure 5:
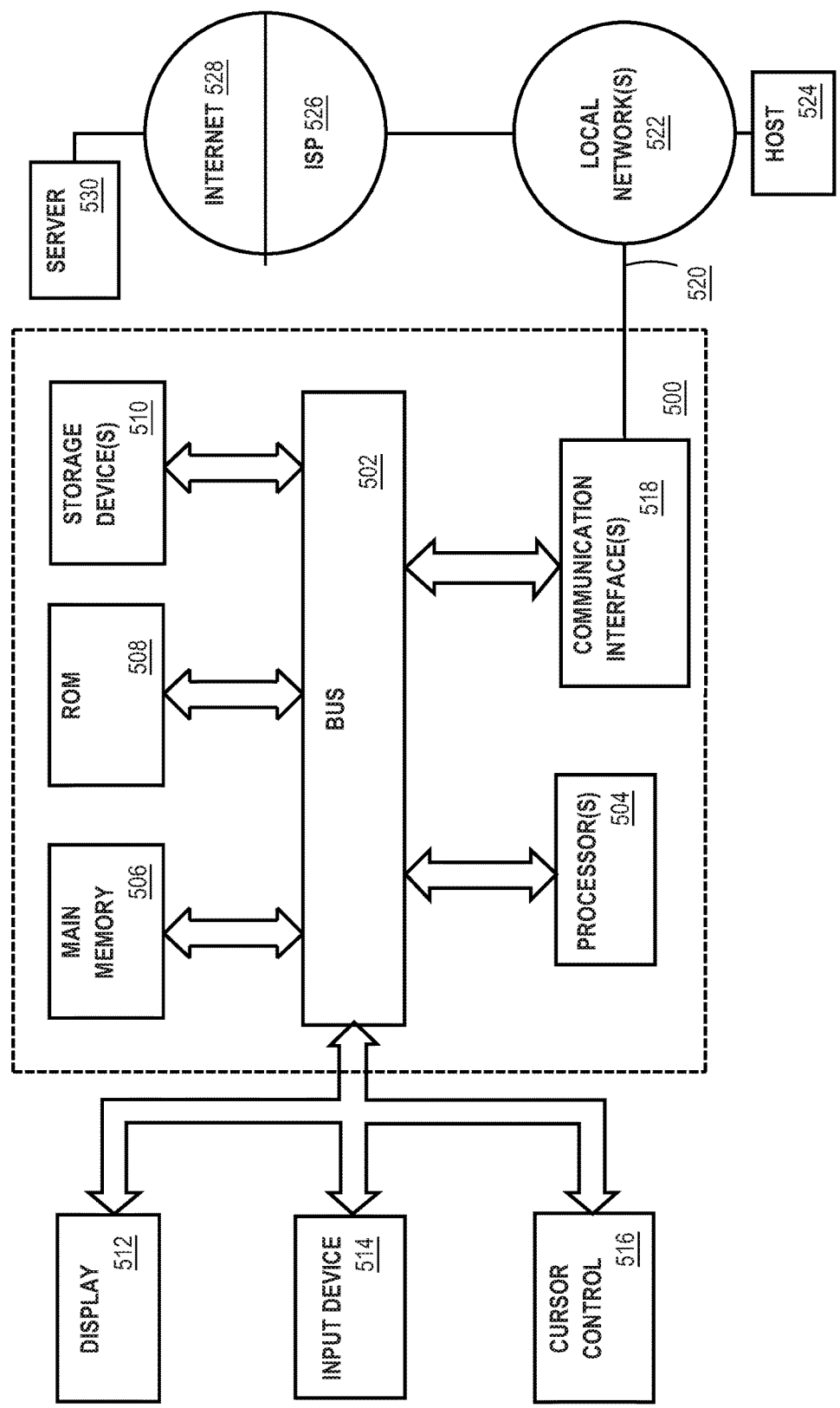
Figure 6:
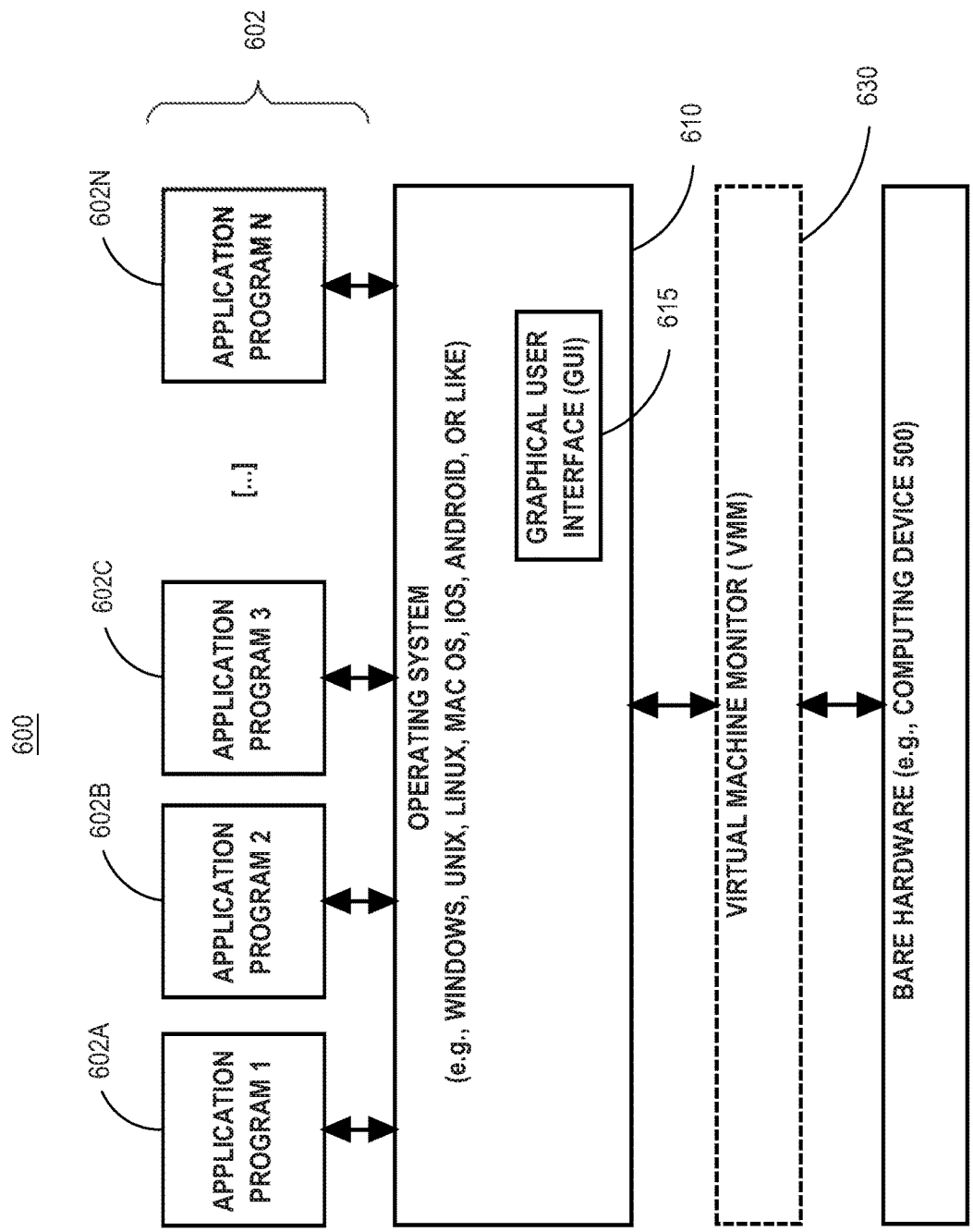
Figure 7:
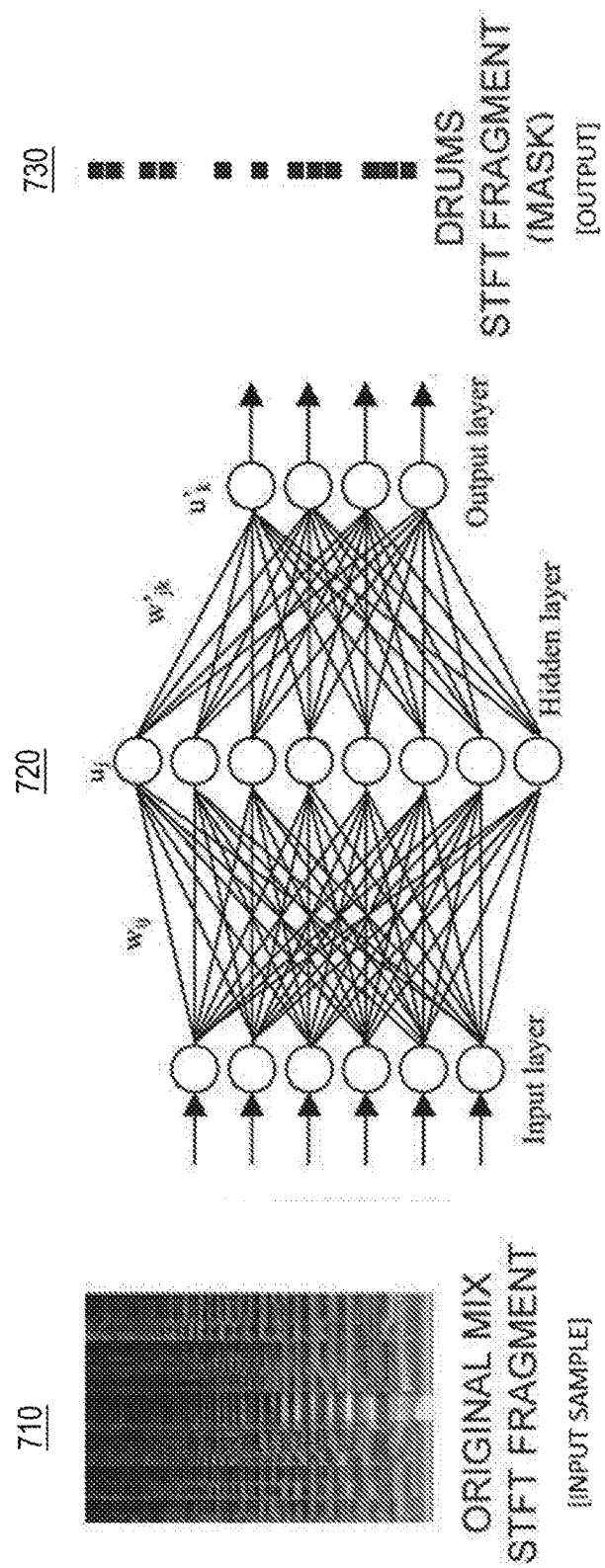
Figure 8A:
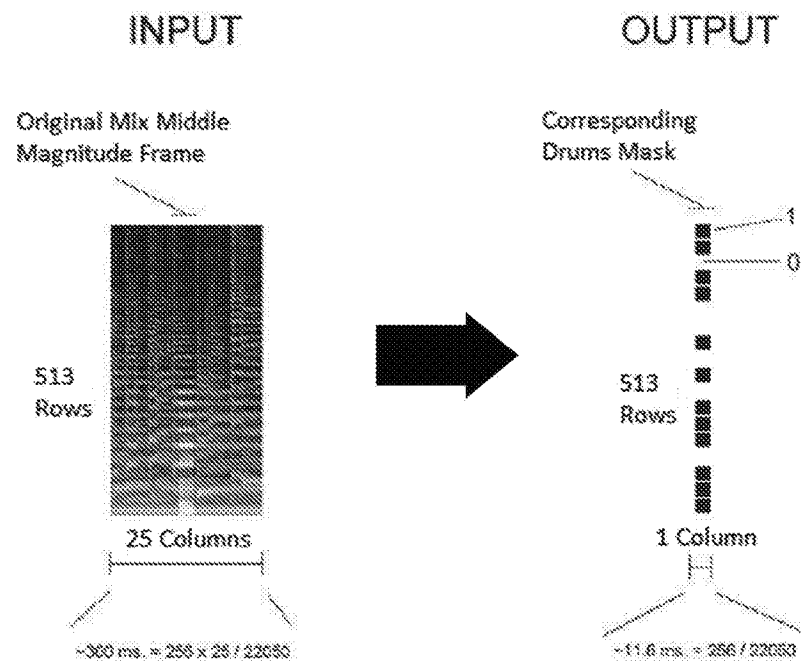
Figure 8B:
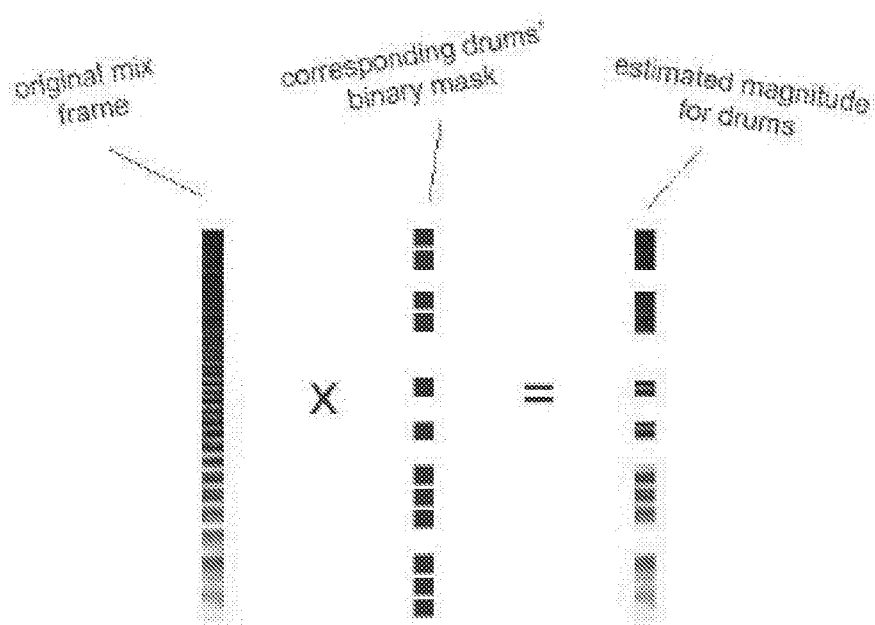
Figure 9:
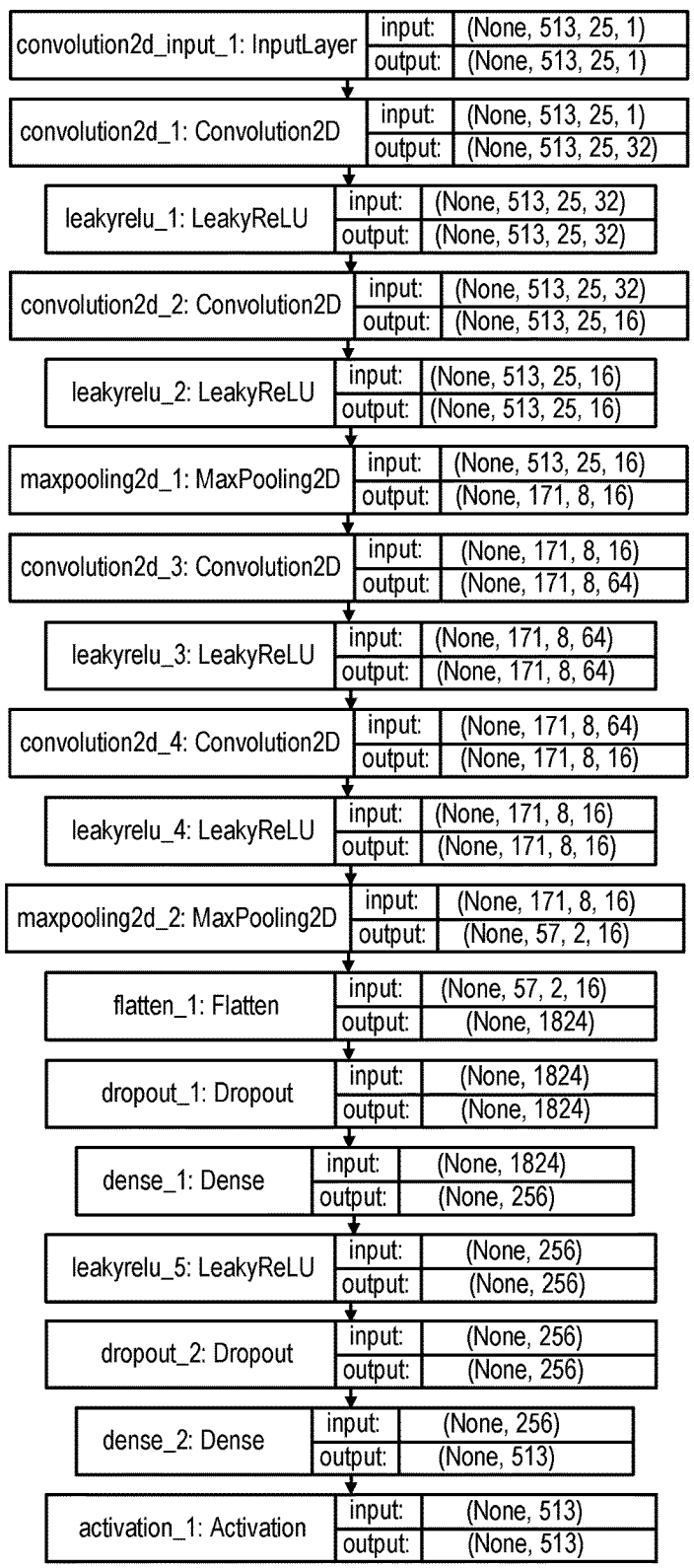

FIG. 12 illustrates a flow diagram of an example process 1200 for real-time audio source separation using audio source separation system 100, according to another embodiment, that utilizes deep neural network (DNN) techniques. FIG. 12 is intended to disclose an algorithm or functional description that may be used as a basis of writing computer programs to implement the functions that are described herein and which cause a computer to operate in the new manner that is disclosed herein. Further, FIG. 12 is provided to communicate such an algorithm at the same level of detail that is normally used, by persons of skill in the art to which this disclosure is directed, to communicate among themselves about plans, designs, specifications and algorithms for other computer programs of a similar level of complexity.

The process 1200 may start at step 1201. At step 1201, server 102 determines whether one or more DNN(s) of audio source separation logic 116 are trained and ready to perform inference, or not. If the one or more DNN(s) of audio source separation logic 116 are trained, then the server 102 is ready to begin audio source separation, and the process 1200 may proceed to step 1202. If the one or more DNN(s) of audio source separation logic 116 have not finished being trained, then the server 102 is not ready to begin audio source separation, and the process 1200 may proceed to step 1230.

In step 1230, audio source separation logic 116 is programmed or configured to train one or more DNN(s) using a training dataset so that the DNN(s) are ready to perform inference on new incoming data. A training dataset may include a plurality of input-output pairs, where each input-output pair includes an example input sample and output binary mask for a given component in a known audio source(s). The training dataset is prestored and may include thousands to millions of input-output pairs. Audio source separation logic 116 is programmed or configured to use a backpropagation algorithm to adjust internal weights of the layers and links to layers in the DNN to improve the DNN's ability to perform audio source separation. In an embodiment, training of the one or more DNN(s) is a one-time operation that only needs to be performed before the first audio source is received. Thus, training of the DNN(s) may occur during times of low activity to prevent having to perform training when live audio sources are received for real-time processing. Once the DNN(s) are trained on based on the training dataset, the process 1200 may proceed to step 1202.

At step 1202, reading/decoding logic 110 is programmed or configured to read an audio source 105 that represents a combined audio signal comprising a plurality of component audio signals. The audio source 105 may be formatted in any available audio format. In an embodiment, reading/decoding logic 110 is programmed or configured to generate a raw audio sample based on audio source 105. For example, in one embodiment, reading/decoding logic 110 may use one or more decoders to decode audio source 105 into raw audio samples. A raw audio sample is an audio sample taken in the time domain, such as a PCM sample. The reading/decoding logic 110 sends the generated raw audio samples to fragmentation logic 112. The process 1200 may then proceed to step 1204.

In step 1204, fragmentation logic 112 is programmed or configured to fragment the raw audio samples received from reading/decoding logic 110. Fragmentation logic 112 may use a preconfigured fragment size to fragment the raw audio samples into a plurality of audio fragments. In one embodiment, each audio fragment may represent greater than or equal to 1.5 seconds of audio and less than or equal to 3.0 seconds of audio. The fragmentation of the raw audio samples into audio fragments is necessary to allow the audio source separation system 100 to process the audio source 105 in real-time and allow for early playback while a given track is still being captured and/or processed. The fragmentation logic 112 sends each audio fragment to transform logic 114 for further processing. The process 1200 may then proceed to step 406.

In step 1206, transform logic 114 is programmed or configured to transform audio fragments into a spectrogram. For each audio fragment of raw audio samples received from fragmentation logic 112, transform logic 114 can apply a transform function to the audio fragment to generate a spectrogram. For example, in one embodiment, transform logic 114 can apply a Short-Time Fast Fourier Transform function to a fragment to generate a spectrogram. In an embodiment, transform logic 114 may optionally be further programmed or configured to apply non-linear interpolation to the spectrogram to provide more weight and improved resolution to the auditory frequencies in the human auditory range. For example, in one embodiment, transform logic 114 may perform non-linear interpolation to the spectrogram using the mel scale, which is one well known psychoacoustic scale for the human auditory range. The resulting spectrogram is sent to audio source separation logic 116. In an embodiment, a magnitude matrix and/or phase matrix of the spectrogram is sent to the audio source separation logic 116. The process 1200 may then proceed to step 1208.

In step 1208, audio source separation logic 116 is programmed to perform audio source separation on the spectrogram using one or more previously-trained DNNs to infer one or more binary mask fragment(s) that correspond to component signals. In one embodiment, audio source separation logic 116 is programmed or configured to process the spectrogram into one or more spectrogram fragments. Each spectrogram fragment represents a temporal period of the spectrogram fragment. For example, in one embodiment, the temporal period of the spectrogram fragment may be approximately 300 milliseconds which is roughly 25 frames when the sampling rate of the audio source is 22,050 Hz. The use of a time period allows for the DNN to consider time frequency and time structure around a particular frame of data to better determine the presence of a particular component in that frame. Thus, in one embodiment, the input sample may be a spectrogram fragment of size 513 rows by 25 columns. Audio source separation logic 116 is programmed or configured to use the original mix spectrogram fragment(s) as an input sample into one or more DNNs to infer and generate one or more outputs. In an embodiment, each DNN may be a single stem model DNN that corresponds to a particular component signal. In another embodiment, the DNN may be a stacked model DNN or a merged model DNN that corresponds to a set of component signals. The one or more DNNs of audio source separation logic 116 were previously trained on a training dataset. Upon receiving the input sample(s), the one or more DNNs generate one or more binary mask fragments as output. These binary mask fragments represent a binary mask for a frame of the input sample for a particular component or instrument in the source signal. Thus, the values of the data in the binary mask fragments indicates the presence or absence of a component in the original input sample at a given frequency. The process 1200 may then proceed to step 1212.

In step 1212, audio source separation logic 116 is programmed or configured to use the binary mask fragment(s) generated by the DNN(s) in step 1208 to estimate the magnitude of the components in the mixed signal. Audio source separation logic 116 may multiply the binary mask(s) with the original mix's magnitude frame(s) to generate the estimated magnitude spectrogram of the component(s). The process 1200 may then proceed to step 1213.

In step 1213, audio source separation logic 116 is programmed or configured to reconstruct the estimated time domain component signals. Audio source separation logic 116 first combines the magnitude spectrogram generated in step 1212 with the original mix's phase information. Audio source separation logic 116 then performs an inverse STFT to generate the estimated time domain signal of the component signal. This estimated time domain signal may then be sent to CCB logic 118. The process 1200 may then proceed to step 1214.

In step 1214, CCB logic 118 is programmed or configured to concatenate the input component signal fragments for each component signal. For example, component signal fragment stream 1 may include component signal fragments for a piano. Each fragment in the component signal fragment stream 1 may be concatenated with one another to generate a full stream for the piano. In one embodiment, CCB logic 118 is programmed to perform crossfading to smooth out the fragments of a reconstructed component signal. In one embodiment, CCB logic 118 may buffer the individual components signals 1 through N. CCB logic 118 may be programmed or configured to send the component signals to client 104. The process 1200 may then proceed to step 1216.

In step 1216, the local buffering logic 120 receives the individual component signal streams from CCB logic 118 and buffers them locally at the client 104 for local playback. The process 1200 may then proceed to step 1218.

In step 1218, semantic equalizer GUI 122 may be used to receive user input on a volume fader to modify the gains to a particular component signal. By modifying the fader's value for a component signal on the semantic equalizer GUI 122, the gain level of the corresponding component signal is modified to multiply the corresponding component signal received from local buffing logic 120. The modified component signals are then received at aggregation logic 124. The process 1200 may then proceed to step 1220.

In step 1220, aggregation logic 124 is programmed or configured to receive the component signals modified by gains and aggregate them into a new stereo audio mixture, where the presence of each component signal is regulated by the values of the faders in the semantic equalizer GUI 122. The process 1200 may then proceed to step 1222.

In step 1222, the playback engine 126 is programmed or configured to play back the final stereo audio mixture provided by aggregation logic 124. The process 1200 may then end.

4.0 Implementation Mechanisms—Hardware Overview

Figure 5:
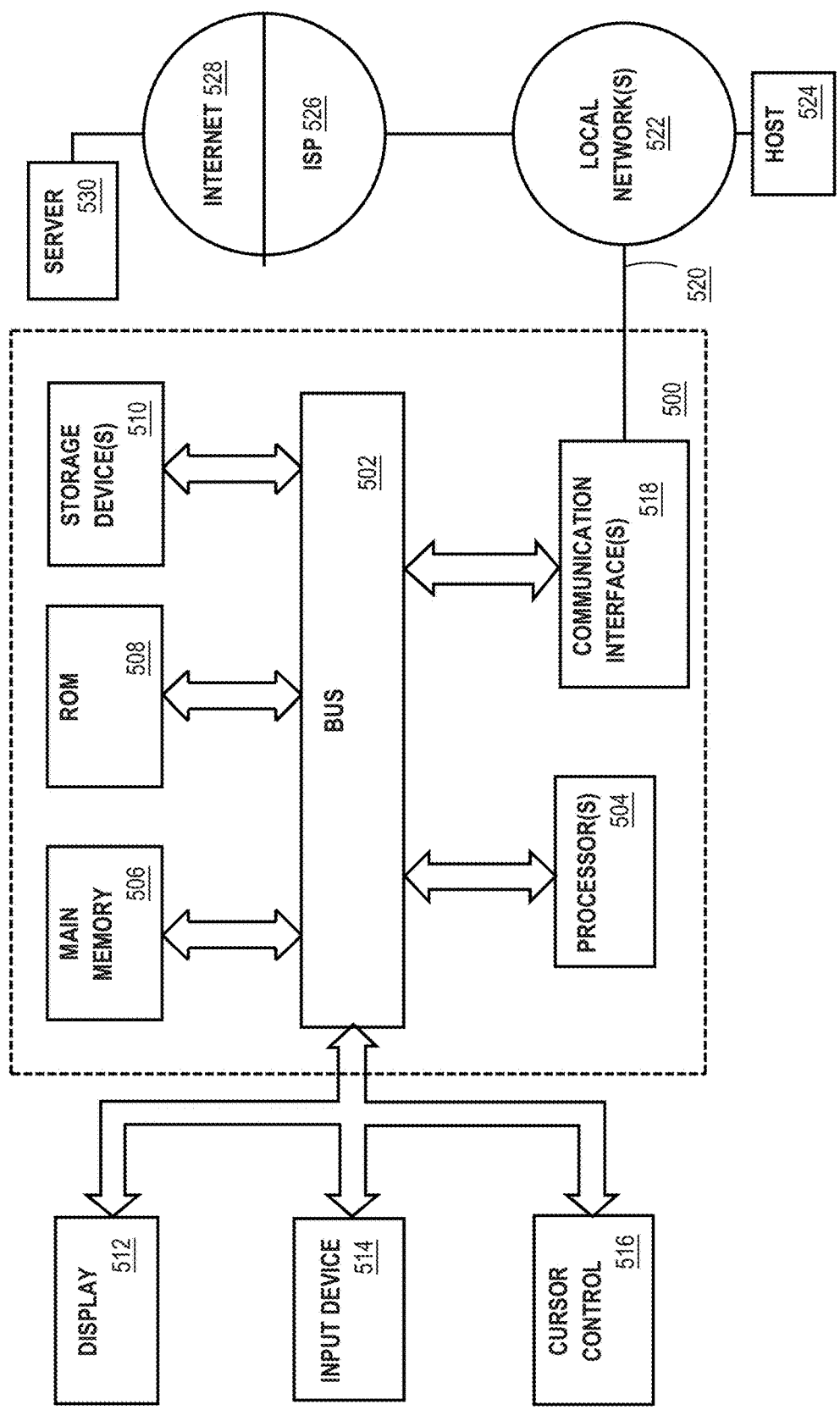
FIG. 5 depicts a block diagram of a computing device in which the example embodiment(s) of the present invention may be embodied.

Referring now to FIG. 5, it is a block diagram that illustrates a basic computing device 500 in which the example embodiment(s) of the present invention may be embodied. Computing device 500 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor. In an embodiment, a hardware processor may include a Graphics Processing Unit (GPU).

Main memory 506, such as a random access memory (RAM) or other dynamic storage device, also may be coupled to bus 502 for storing information and software instructions to be executed by processor(s) 504. Main memory 506 also may be used for storing temporary variables or other intermediate information during execution of software instructions to be executed by processor(s) 504.

Software instructions, when stored in storage media accessible to processor(s) 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor(s) 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such software instructions may be read into main memory 506 from another storage medium, such as storage device(s) 510. Execution of the software instructions contained in main memory 506 cause processor(s) 504 to perform the functions of the example embodiment(s).

While functions and operations of the example embodiment(s) may be implemented entirely with software instructions, hard-wired or programmable circuitry of computing device 500 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infrared data communications.

Various forms of media may be involved in carrying one or more sequences of one or more software instructions to processor(s) 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor(s) 504 retrieves and executes the software instructions. The software instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

5.0 Implementation Mechanisms—Software Overview

Figure 6:
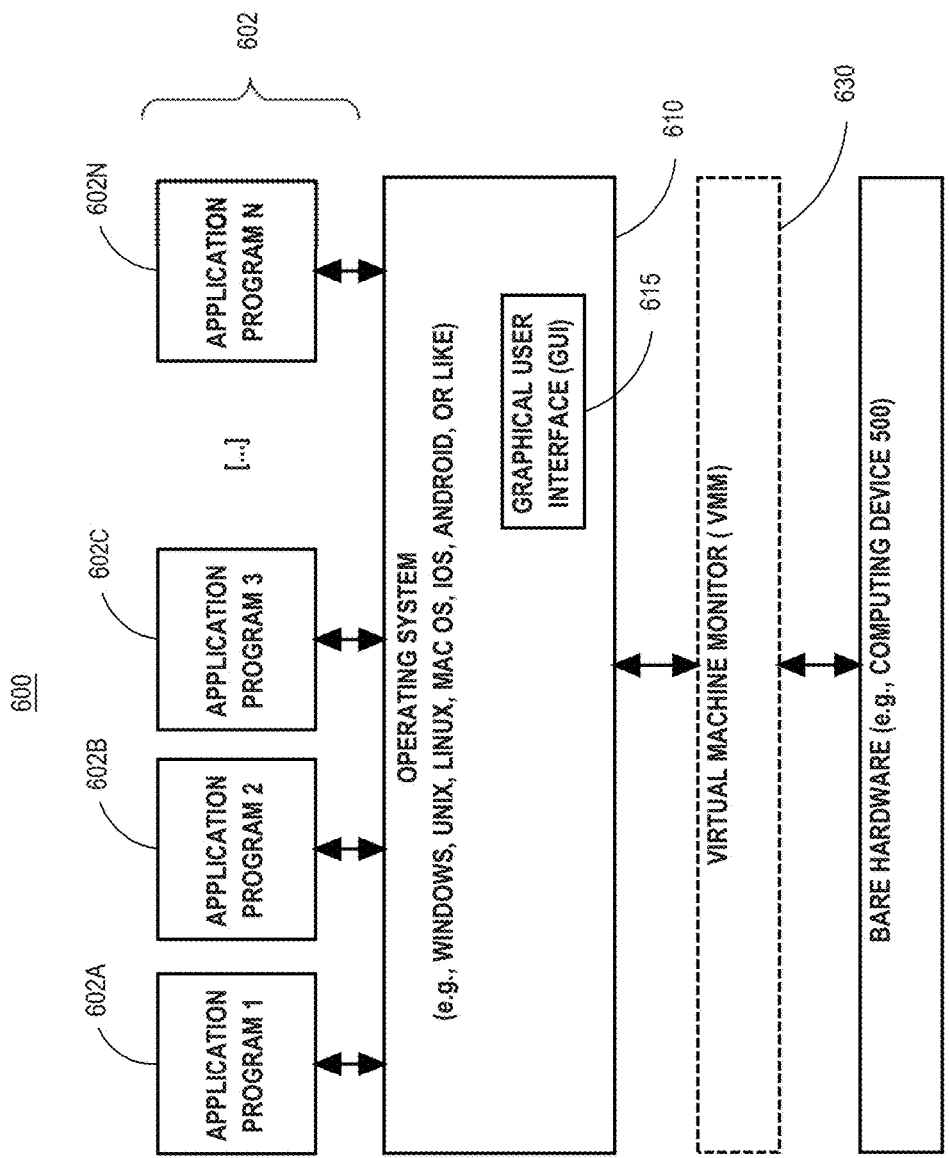
FIG. 6 depicts a block diagram of a basic software system for controlling the operation of the computing device.

FIG. 6 is a block diagram of a basic software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of device 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

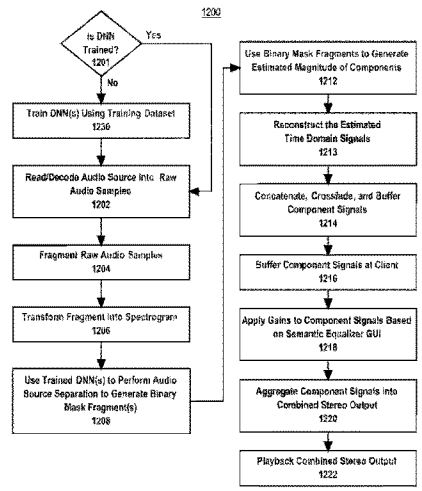

The invention claimed is:

1. A method comprising:
reading an audio source, wherein the audio source represents a combined audio signal that comprises a plurality of component signals;
generating, based on the audio source, a plurality of pulse-code modulation (PCM) samples;
fragmenting the PCM samples into a plurality of PCM sample fragments;
for each particular PCM sample fragment of the plurality of PCM sample fragments:
transforming the particular PCM sample fragment into a spectrogram;
processing the spectrogram into one or more spectrogram fragments;
inputting the one or more spectrogram fragments into a deep neural network;
generating, by the deep neural network, one or more binary mask fragments wherein each binary mask fragment of the one or more binary mask fragments corresponds to one or more component signals of the plurality of component signals;
using the one or more binary mask fragments to estimate the plurality of component signals;
wherein the method is performed using one or more processors.

2. The method of claim 1, wherein the deep neural network is a stem model deep neural network that corresponds to a single component signal of the plurality of component signals.

3. The method of claim 1, wherein the deep neural network is a stacked model deep neural network that corresponds to the plurality of component signals.

4. The method of claim 1, wherein the deep neural network is a merged model deep neural network that corresponds to the plurality of component signals.

5. The method of claim 1, wherein each spectrogram fragment of the one or more spectrogram fragments comprises 25 frames of data.

6. The method of claim 1, wherein the deep neural network is trained using a backpropagation algorithm on a training dataset.

7. The method of claim 1, wherein transforming the particular PCM sample fragment into a spectrogram comprises applying a Short-Time Fast Fourier Transform to the particular PCM sample fragment.

8. The method of claim 1, wherein using the one or more binary mask fragments to estimate the plurality of component signals comprises multiplying a middle frame of the one or more spectrogram fragments with the one or more binary mask fragments.

9. The method of claim 1, wherein transforming the particular PCM sample fragment into a spectrogram comprises applying a Short-Time Fast Fourier Transform to the particular PCM sample fragment.

10. One or more non-transitory computer-readable media storing instructions, which when executed by one or more processors cause:
reading an audio source, wherein the audio source represents a combined audio signal that comprises a plurality of component signals;
generating, based on the audio source, a plurality of pulse-code modulation (PCM) samples;
fragmenting the PCM samples into a plurality of PCM sample fragments;
for each particular PCM sample fragment of the plurality of PCM sample fragments:
transforming the particular PCM sample fragment into a spectrogram;
processing the spectrogram into one or more spectrogram fragments;
inputting the one or more spectrogram fragments into a deep neural network;
generating, by the deep neural network, one or more binary mask fragments corresponding to the plurality of component signals; and
using the one or more binary mask fragments to estimate the plurality of component signals.

11. The one or more non-transitory computer-readable media of claim 10, wherein the deep neural network is a stem model deep neural network that corresponds to a single component signal of the plurality of component signals.

12. The one or more non-transitory computer-readable media of claim 10, wherein the deep neural network is a stacked model deep neural network that corresponds to the plurality of component signals.

13. The one or more non-transitory computer-readable media of claim 10, wherein the deep neural network is a merged model deep neural network that corresponds to the plurality of component signals.

14. The one or more non-transitory computer-readable media of claim 10, wherein each spectrogram fragment of the one or more spectrogram fragments comprises 25 frames of data.

15. The one or more non-transitory computer-readable media of claim 10, wherein the deep neural network is trained using a backpropagation algorithm on a training dataset.

16. The one or more non-transitory computer-readable media of claim 10, wherein transforming the particular PCM sample fragment into a spectrogram comprises applying a Short-Time Fast Fourier Transform to the particular PCM sample fragment.

17. The one or more non-transitory computer-readable media of claim 10, wherein using the one or more binary mask fragments to estimate the plurality of component signals comprises multiplying a middle frame of the one or more spectrogram fragments with the one or more binary mask fragments.

18. The one or more non-transitory computer-readable media of claim 10, wherein transforming the particular PCM sample fragment into a spectrogram comprises applying a Short-Time Fast Fourier Transform to the particular PCM sample fragment.

* * * * *

UNITED STATES PATENT AND TRADEMARK OFFICE
CERTIFICATE OF CORRECTION

| | |
|---|---|
| PATENT NO. | : 10,014,002 B2 |
| APPLICATION NO. | : 15/792566 |
| DATED | : July 3, 2018 |
| INVENTOR(S) | : Alejandro Koretzky, Karthiek Reddy Bokka and Naveen Sasalu Rajashekharappa |

It is certified that error appears in the above-identified patent and that said Letters Patent is hereby corrected as shown below:

On the Title Page

Delete the title page and replace with attached title page consisting of the corrected number of drawing sheets.

In the Drawings

Delete Drawing Sheets 1-14 and replaced with the attached Drawing Sheets 1-15 consisting of Figs. 1-11B.

Signed and Sealed this
Eighteenth Day of June, 2019

Andrei Iancu
*Director of the United States Patent and Trademark Office*

(12) United States Patent
Koretzky et al.

(10) Patent No.: US 10,014,002 B2
(45) Date of Patent: Jul. 3, 2018

(54) REAL-TIME AUDIO SOURCE SEPARATION USING DEEP NEURAL NETWORKS

(71) Applicant: Red Pill VR, Inc., Los Angeles, CA (US)

(72) Inventors: Alejandro Koretzky, Venice, CA (US); Karthiek Reddy Bokka, Los Angeles, CA (US); Naveen Sasalu Rajashekharappa, Los Angeles, CA (US)

(73) Assignee: Red Pill VR, Inc., Los Angeles, CA (US)

( * ) Notice: Subject to any disclaimer, the term of this patent is extended or adjusted under 35 U.S.C. 154(b) by 0 days.

(21) Appl. No.: 15/792,566

(22) Filed: Oct. 24, 2017

(65) Prior Publication Data

US 2018/0122403 A1    May 3, 2018

Related U.S. Application Data

(63) Continuation-in-part of application No. 15/434,419, filed on Feb. 16, 2017, now Pat. No. 9,842,609.

(60) Provisional application No. 62/295,497, filed on Feb. 16, 2016.

(51) Int. Cl.
| | |
|---|---|
| *H04R 5/00* | (2006.01) |
| *G10L 25/18* | (2013.01) |
| *G10L 25/30* | (2013.01) |
| *G10L 21/028* | (2013.01) |
| *G06F 3/16* | (2006.01) |

(52) U.S. Cl.
CPC ............ *G10L 25/18* (2013.01); *G10L 21/028* (2013.01); *G10L 25/30* (2013.01); *G06F 3/165* (2013.01)

(58) Field of Classification Search
CPC ....... G10L 25/18; G10L 21/028; G10L 21/14; G10L 21/0272; G10L 25/30; G06F 3/165; G06F 3/04847; H04S 2420/07; H04S 5/00
USPC .............................................. 381/17, 20, 22
See application file for complete search history.

(56) References Cited

U.S. PATENT DOCUMENTS

| | | | |
|---|---|---|---|
| 2016/0071526 A1* | 3/2016 | Wingate | G10L 21/028 704/233 |
| 2017/0061978 A1* | 3/2017 | Wang | G10L 21/0232 |
| 2017/0316792 A1* | 11/2017 | Chaudhuri | G10L 25/93 |

* cited by examiner

*Primary Examiner* — Matthew Eason
*Assistant Examiner* — Sabrina Diaz
(74) *Attorney, Agent, or Firm* — Hickman Palermo Becker Bingham LLP

(57) ABSTRACT

Methods and systems for audio source separation in real-time are described. In an embodiment, the present disclosure describes reading and decoding an audio source into PCM samples, fragmenting Pulse Code Modulation (PCM) samples into fragments, transforming fragments into spectrograms, performing audio source separation using a deep neural network (DNN) to generate an estimated magnitude spectrogram of the component(s) of the audio source, reconstructing the estimated time domain component signals, and streaming the component signals to a playback engine. In an embodiment, a semantic equalizer graphical user allows for real-time mixing of individual component signals.

18 Claims, 15 Drawing Sheets